United States Patent [19]
Takahashi et al.

[11] Patent Number: 5,538,193
[45] Date of Patent: Jul. 23, 1996

[54] WASTE PAPER PROCESSING SYSTEM

[75] Inventors: Hitoshi Takahashi, Tokyo; Takashi Asano, Hiratsuka, both of Japan

[73] Assignee: Meiden Plant Engineering & Construction Co., Ltd., Tokyo, Japan

[21] Appl. No.: 453,876

[22] Filed: May 30, 1995

Related U.S. Application Data

[62] Division of Ser. No. 67,613, May 27, 1993, Pat. No. 5,427,321.

[30] Foreign Application Priority Data

| Jul. 3, 1992 | [JP] | Japan | 4-46251 U |
| Sep. 9, 1992 | [JP] | Japan | 4-240152 |
| Nov. 6, 1992 | [JP] | Japan | 4-296824 |
| Feb. 25, 1993 | [JP] | Japan | 5-36257 |
| Mar. 22, 1993 | [JP] | Japan | 5-60828 |
| Mar. 25, 1993 | [JP] | Japan | 5-13804 U |
| Apr. 16, 1993 | [JP] | Japan | 5-89601 |
| Apr. 19, 1993 | [JP] | Japan | 5-91087 |

[51] Int. Cl.$^6$ ............................... B02C 18/06
[52] U.S. Cl. .......... 241/33; 241/38; 241/100; 241/166; 241/222; 241/243
[58] Field of Search .............. 241/73, 100, 38, 241/236, 33, 235, 242, 243, 166, 167, 222

[56] References Cited

U.S. PATENT DOCUMENTS

| 3,550,527 | 12/1970 | Petrovich et al. |
| 4,061,278 | 12/1977 | Ehinger . |
| 4,256,035 | 3/1981 | Neufeldt . |
| 4,385,732 | 5/1983 | Williams . |
| 4,538,766 | 9/1985 | Vandenbussche . |
| 4,607,800 | 8/1986 | Barclay . |
| 4,690,337 | 9/1987 | Stiefel . |
| 4,691,871 | 9/1987 | Mochizuki . |
| 5,062,576 | 11/1991 | Burda . |
| 5,201,475 | 4/1993 | Nahagomi . |
| 5,248,100 | 9/1993 | Arakawa . |

FOREIGN PATENT DOCUMENTS

| 0493725 | 7/1992 | European Pat. Off. . |
| 2364693 | 4/1978 | France . |
| 2384060 | 10/1978 | France . |
| 1813501 | 7/1969 | Germany . |
| 1300028 | 6/1970 | Germany . |
| 2457168 | 6/1976 | Germany . |
| 2516111 | 10/1976 | Germany . |
| 2944328 | 5/1980 | Germany . |
| 8910922.8 | 11/1989 | Germany . |
| 4011248 | 10/1991 | Germany . |
| 1-43173 | 1/1989 | Japan . |
| 64-43173 | 3/1989 | Japan . |
| 4-135656 | 5/1992 | Japan . |
| 0676090 | 12/1990 | Switzerland . |
| 88/08466 | 11/1988 | WIPO . |

*Primary Examiner*—Mark Rosenbaum
*Attorney, Agent, or Firm*—Foley & Lardner

[57] ABSTRACT

A waste paper processing system includes an upper shredding portion and a lower compressing portion. The shredding portion includes to horizontally parallel shafts mounting thereon a plurality of circular blades. The shafts are rotated to spin outwardly of a space between the shafts from a paper feeding direction. Presser arms are provided for retaining paper from above during shredding and stopper arms and a filter portion are provided below the blades to assure the paper is shredded sufficiently. After shredding the paper falls into a hopper and is introduced via a rotor to the compression portion. In the compression portion a screw is rotated for urging the shredded paper into a compression tube the tube as a narrower portion at the lower end for assuring sufficient compression of the shredded paper. In addition, water is added to the shredded paper in the upper side of the compression tube for binding the shredded paper together as pulp. A sensor arrangement is provided for assuring sufficient water is introduced to the shredded paper automatically during compression operation. After the pulp is output from the compression portion, a conveyer arrangement is provided for loading the pulp into a tray or bag to facilitate easy disposal or recycling.

53 Claims, 33 Drawing Sheets

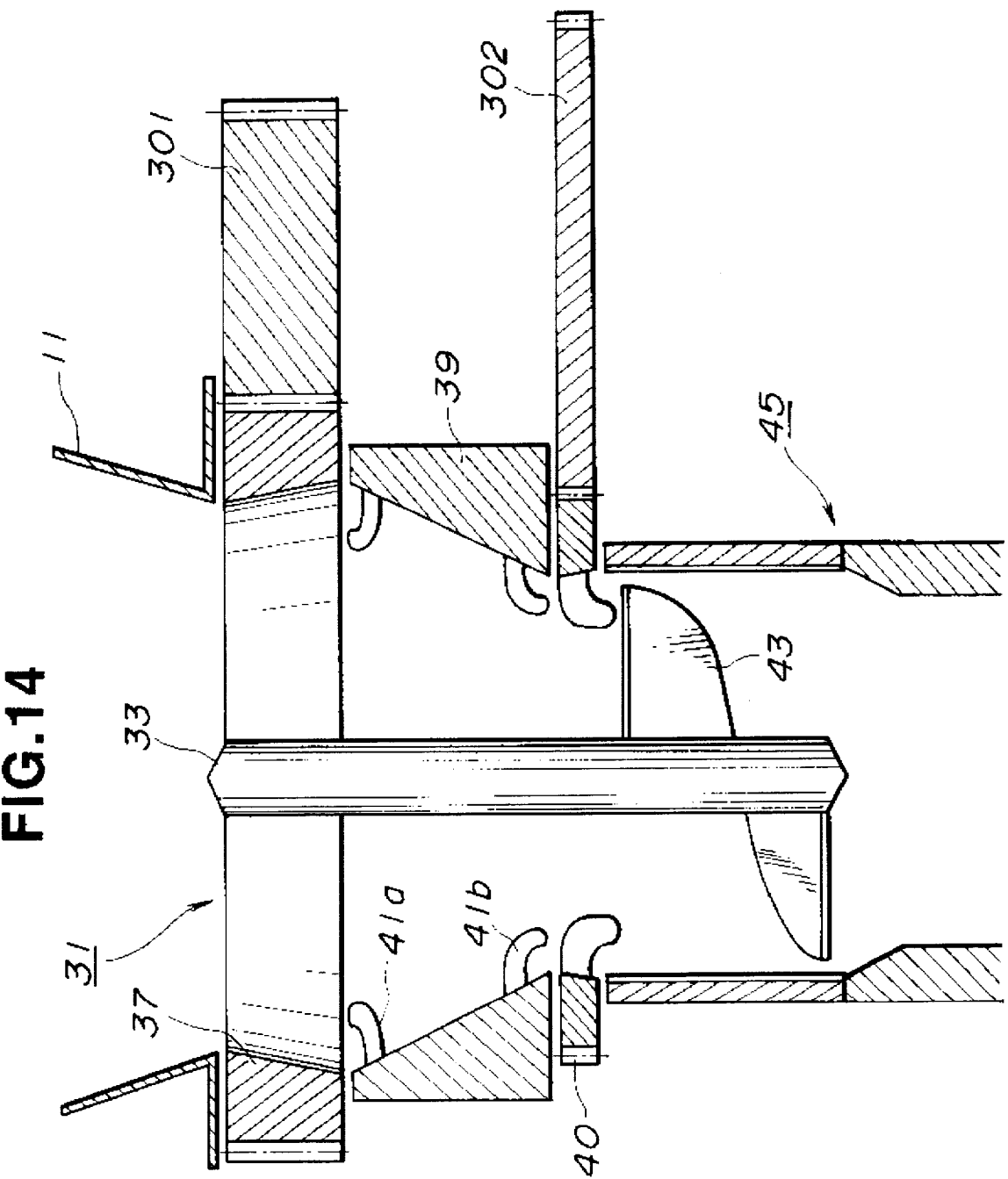

5,538,193

WASTE PAPER PROCESSING SYSTEM

This application is a division of application Ser. No. 08/067,613, filed May 27, 1993, now U.S. Pat. No. 5,427,321.

BACKGROUND OF THE INVENTION

1. Field of The Invention

The present invention relates generally to a disposal system for waste paper. Specifically, the present invention relates to a system for shredding and compacting sheets of waste paper such that the volume of the shredded paper is significantly reduced.

2. Description of The Prior Art

Disposal of waste paper is a problem facing all types of businesses since the volume of paper involved in all types of transactions and publications is very high. Further, due to environmental considerations, it is preferable that paper be disposed of in a manner which allows recycling thereof to conserve resources.

Thus, paper shedders are used by many businesses to dispose of waste paper. However, according to this, shredding is carried out according to cutting of the paper into a plurality of elongated strips, producing an inconveniently high volume of shredded paper which may complicate ease of disposal and recycling.

Thus, it has been required to provide a system for disposing of waste paper in which a volume of processed waste paper is held low while ease of recycling may be enhanced.

Another consideration in the utilization of paper shredders is document security, wherein documents considered classified or secret by a user may be shredded after use to maintain security of the contents. However, as noted above, since paper shredders commonly slice paper into long strips which remain bulked together after shredding, it is possible that document security may be compromised.

Thus, it has further been required to provide a waste paper disposal system in which disposed of documents may not be reconstituted from the output of the disposal system.

Japanese Utility Model Application (first publication) No. 1-43173 discloses a waste paper disposal system including a shredding portion and a waste paper compression portion for addressing the above problems. According to this disclosure, waste paper is dropped into a shredding chamber having parallel rotatable shafts mounting thereon a plurality of blades, the shafts are driven so as to respectively rotate toward a space defined between the shafts. Above the shafts mounting the blades for shredding, another pair of shafts mount projecting members which are rotated for separating sheets of paper before shredding. In addition, below the shredding chamber a hopper directs shredded paper to a screw which is mounted so as to be axially parallel to the blade shafts. The screw is rotated so as to drive waste paper to a tapered end thereof which is housed in a tapered chamber at which the shredded paper is moistened by water of the like, by this action the shredded paper is compressed and output via a cylindrical output tube for reducing a volume of waste paper output.

However, according to the above, a large area is required for such an apparatus and all shredding occurs in the space between the blade shafts which may cause clogging if a large volume of paper is to be shredded. Further, the provision of the rotating projecting members increases a required height for the apparatus. In addition, when large volumes of paper are to be processed, the shredded paper is very bulky and disposal thereof is inconvenient.

SUMMARY OF THE INVENTION

It is therefore a principal object of the present invention to overcome the drawbacks of the prior art.

It is also an object of the invention to provide a waste paper disposal system which is compact and may be fed large volumes of waste paper without clogging of blade mounting shafts during operation.

It is a further object of the present invention to provide a waste paper disposal system which reduces sheets of paper to particulate form and compresses an output of waste paper in a high-density, low volume form and facilitates easy disposal and/or recycling thereof without dust or spillage.

In order to accomplish the aforementioned and other objects, a waste paper processing system is provided, comprising: a processor casing defining therein a shredding chamber, an inclined paper inlet opening provided on an upper side of the casing, a driving power source, first and second rotatably driven shafts horizontally arranged parallel to each other and driven by the driving power source so as to rotate in mutually opposite directions, such that the shafts spin outwardly of a center space between the shafts from a paper feeding direction, a plurality of circular blades respectively mounted axially spaced along each of the shafts and having a plurality of teeth portions formed on the circumferences thereof, an orientation of the teeth portions of each of the blades being in a direction of the rotational direction of the blade respectively, a plurality of presser arms mounted on opposing side walls of the shredding chamber so as to be pivotable in the upward direction by a predetermined degree, the presser arms projecting above and perpendicularly to the shafts such that each presser arm is respectively provided above a space between two of the blades of each of the shafts on two opposing sides of the shredding chamber, a plurality of stopper arms projected from the side wall of the shredding chamber perpendicular to and below the shafts directly below and substantially on the same plane as corresponding presser arms such that each of the stopper arms is respectively provided below a space between two of the blades of each of the shafts on two opposing sides of the shredding chamber, and a filter provided at a lower side of the shredding chamber so as to catch paper larger than a predetermined size, the filter formed of a plurality of parallel wire portions arranged parallel to the plane of the blades.

According to another aspect of the present invention, there is provided a waste paper processing system, comprising: processor casing defining therein a shredding chamber, an inclined paper inlet opening provided on an upper side of the casing, a driving power source, first and second rotatably driven shafts horizontally arranged parallel to each other and driven by the driving power source so as to rotate in mutually opposite directions, such that the shafts spin outwardly of a center space between the shafts from a paper feeding direction, a plurality of circular blades respectively mounted axially spaced along each of the shafts and having a plurality of teeth portions formed on the circumferences thereof, an orientation of the teeth portions of each of the blades being in a direction of the rotational direction of the blade respectively, a plurality of main presser arms pivotably mounted on opposing side walls of the shredding chamber, each of the main presser arms so positioned to project over a space between two of the blades spaced along one of the shafts so as to be positioned between two blades, one on either side thereof, each of the main presser arms accommodating a shaft provided perpendicularly to the projecting direction of the main presser arm via an opening provided therethrough, and further having secondary presser arms positioned between the two of the blades on either side of the main presser arm pivotally mounted on the shaft, a plurality of stopper arms projected from the side wall of the shredding chamber perpendicular to and below the shafts directly below and substantially on the same plane as corresponding presser arms such that each of the stopper arms is respectively provided below a space between two of the blades of each of the shafts on two opposing sides of the shredding chamber, and a filter provided at a lower side of the shredding chamber so as to catch paper larger than a predetermined size, the filter formed of a plurality of parallel wire portions arranged parallel to the plane of the blades.

Also, according to a still further aspect of the invention, a waste paper processing system is provided which comprises: a driving source, paper shredding means, a substantially funnel-shaped hopper provided at the lower side of the paper shredding means, a rotor comprising a first annular ring rotatably driven by the driving source and positioned to correspond to an outlet side of the hopper, the first annular ring joined to a main shaft, axially aligned with the hopper and extending downward vertically therefrom, by a plurality of spokes radially projected from an upper side of the main shaft, the main shaft rotatably driven according to rotation of the first annular ring and further including a screw blade spirals projected from a lower side of the main shaft to a predetermined circumference, the screw blade terminating at an lower end of the main shaft, a sub-hopper positioned below the first annular ring and receiving therethrough an upper portion of the main shaft above that supporting the screw blade, the sub-hopper having an inwardly tapered inner surface having a plurality of stopper hooks projected therefrom, a scraper comprising an second annular ring rotatably driven by the driving source and positioned at a lower side of the sub-hopper, the second annular ring receiving therethrough a portion of the main shaft below that received by the sub-hopper and above that supporting the screw blade, the second annular ring mounting a plurality of scraper blades projected radially inward from the annular ring, ends of the scraper blades being downwardly oriented and positioned so as to pass closely proximate a leading edge of the screw blade where the leading edge is projected from the lower side of the main shaft according to rotation of the second annular ring and of the screw blade, a compression tube portion receiving a predetermined length of the main shaft mounting the screw blade, the compression portion comprising, an inner circumference closely accommodating an outer circumference of the screw blade and having a serrated surface at least at an upper side thereof corresponding to a received length of the main shaft, a lower portion of the compression tube portion having an inner circumference smaller than the upper side thereof by a predetermined degree, a gap, provided between the upper and lower sides of the compression tube portion, the gap formed as a circular groove between the upper and lower tubes and having a diameter equal to or wider than the upper tube, an output opening at a lower side of the lower portion of the compression tube, and moisturizing means active to introduce a fluid into the compression tube during compressing operation on the waste paper, the moisturizing means including a plurality of fluid inlets spaced circumferentially around an upper side of the compression tube and a fluid source connected to the fluid inlets.

According to still another aspect of the invention, there is provided a waste paper processing system, comprising: a driving source, a substantially funnel-shaped hopper receiving therein waste paper in particulate for to be processed, a rotor comprising a first annular ring rotatably driven by the driving source and positioned to correspond to an outlet side of the hopper, the first annular ring joined to a main shaft, axially aligned with the hopper and extending downward vertically therefrom, by a plurality of spokes radially projected from an upper side of the main shaft, the main shaft rotatably driven according to rotation of the first annular ring and further including a screw blade spirally projected from a lower side of the main shaft to a predetermined circumference, the screw blade terminating at an lower end of the main shaft, a scraper comprising an second annular ring rotatably driven by the driving source and positioned at a lower side of first annular ring, the second annular ring receiving therethrough a portion of the main shaft below that received through the first annular ring and above that supporting the screw blade, the second annular ring mounting a plurality of scraper blades projected radially inward from the annular ring, ends of the scraper blades being downwardly oriented and positioned so as to pass closely proximate a leading edge of the screw blade where the leading edge is projected from the lower side of the main shaft according to rotation of the second annular ring and of the screw blade, a compression tube portion receiving a predetermined length of the main shaft mounting the screw blade, the compression portion comprising, an inner circumference closely accommodating an outer circumference of the screw blade and having a serrated portion of an inner surface thereof at least at an upper side thereof, an output opening at a lower side of the lower portion of the compression tube, and moisturizing means active to introduce a fluid into the compression tube during compressing operation on the waste paper, the moisturizing means including a plurality of fluid inlets spaced circumferentially around an upper side of the compression tube and a fluid source connected to the fluid inlets.

And, also in accordance with the present invention a waste paper processing system is provided which comprises: a processor casing defining therein a shredding chamber, an inclined paper inlet opening provided on an upper side of the casing, a driving power source, first and second rotatably driven shafts horizontally arranged parallel to each other and driven by the driving power source so as to rotate in mutually opposite directions, such that the shafts spin outwardly of a center space between the shafts from a paper feeding direction, a plurality of circular blades respectively mounted axially spaced along each of the shafts and having a plurality of teeth portions formed on the circumferences thereof, an orientation of the teeth portions of each of the blades being in a direction of the rotational direction of the blade respectively, a plurality of presser arms mounted on opposing side walls of the shredding chamber so as to be pivotable in the upward direction by a predetermined degree, the presser arms projecting above and perpendicularly to the shafts such that each presser arm is respectively provided above a space between two of the blades of each of the shafts on two opposing sides of the shredding chamber, a plurality of stopper arms projected from tile side wall of the shredding chamber perpendicular to and below the shafts directly below and substantially on the same plane as corresponding presser arms such that each of the stopper arms is respectively provided below a space between two of the blades of each of the shafts on two opposing sides of the shredding chamber, a filter provided at a lower side of the shredding chamber so as to catch paper larger than a predetermined size, the filter formed of a plurality of parallel wire portions arranged parallel to the plane of the blades, a substantially funnel-shaped hopper arranged below the filter so as to receive shredded paper from the shredding chamber, a rotor comprising a first annular ring rotatably driven by the driving source and positioned to correspond to an outlet side of the hopper, the first annular ring joined to a main shaft, axially aligned with the hopper and extending downward vertically therefrom, by a plurality of spokes radially projected from an upper side of the main shaft, the main shaft rotatably driven according to rotation of the first annular ring and further including a screw blade spirally projected from a lower side of the main shaft to a predetermined circumference, the screw blade terminating at an lower end of the main shaft, a scraper comprising an second annular ring rotatably driven by the driving source and positioned at a lower side of first annular ring, the second annular ring receiving therethrough a portion of the main shaft below that received through the first annular ring and above that supporting the screw blade, the second annular ring mounting a plurality of scraper blades projected radially inward from the annular ring, ends of the scraper blades being downwardly oriented and positioned so as to pass closely proximate a leading edge of the screw blade where the leading edge is projected from the lower side of the main shaft according to rotation of the second annular ring and of the screw blade, a compression tube portion receiving a predetermined length of the main shaft mounting the screw blade, the compression portion comprising, an inner circumference closely accommodating an outer circumference of the screw blade and having a serrated portion of an inner surface thereof at an upper side thereof, an output opening at a lower side of the lower portion of the compression tube, and moisturizing means active to introduce a fluid into the compression tube daring compressing operation on the waste paper, the moisturizing means comprising: a fluid source, a plurality of fluid inlets spaced circumferentially around an upper side of the compression tube, a first photosensor arranged on the plane of a lower side of the paper inlet opening and active to detect completion of insertion of paper into the paper inlet opening and output a first signal indicative thereof, a second photosensor provided at a lower side of the hopper for detecting completion of shredding operation by the shredding section and outputting a second signal indicative thereof, an electronically operable valve interposed between the fluid source and the fluid inlets, fluid lines connected the fluid source to the fluid inlets respectively via the electronically operable valve, a control unit receiving the first and second signals and, upon receiving the first signal, outputting the a first command to the electronic valve for turning on electronic valve such that fluid is allowed to flow from the fluid tank to the fluid inlets via the fluid lines for introducing a predetermined amount of fluid to the compression tube via the fluid inlets, for effecting moistening of the shredded paper for forming pulped paper, and, upon receiving the second signal, transmitting a second command to the electronic valve for closing same so as to cease the flow of fluid to the fluid outlets.

There present invention further provides a waste paper processing system, comprising: a driving source, paper shredding means, a substantially funnel-shaped hopper provided at the lower side of the paper shredding means, a rotor comprising a first annular ring rotatably driven by the driving source and positioned to correspond to an outlet side of the hopper, the first annular ring joined to a main shaft, axially aligned with the hopper and extending downward vertically therefrom, by a plurality of spokes radially projected from an upper side of the main shaft, the main shaft rotatably driven according to rotation of the first annular ring and further including a screw blade spirally projected from a lower side of the main shaft to a predetermined circumference, the screw blade terminating at an lower end of the main shaft, a sub-hopper positioned below the first annular ring and receiving therethrough an upper portion of the main shaft above that supporting the screw blade, the sub-hopper having an inwardly tapered inner surface having a plurality of stopper hooks projected therefrom, a scraper comprising an second annular ring rotatably driven by the driving source and positioned at a lower side of the sub-hopper, the second annular ring receiving therethrough a portion of the main shaft below that received by the sub-hopper and above that supporting the screw blade, the second annular ring mounting a plurality of scraper blades projected radially inward from the annular ring, ends of the scraper blades being downwardly oriented and positioned so as to pass closely proximate a leading edge of the screw blade where the leading edge is projected from the lower side of the main shaft according to rotation of the second annular ring and of the screw blade, a compression tube portion receiving a predetermined length of the main shaft mounting the screw blade, the compression portion comprising, an inner circumference closely accommodating an outer circumference of the screw blade and having a serrated surface at least at an upper side thereof corresponding to a received length of the main shaft, a lower portion of the compression tube portion having an inner circumference smaller than the upper side thereof by a predetermined degree, a gap, provided between the upper and lower sides of the compression tube portion, the gap formed as a circular groove between the upper and lower tubes and having a diameter equal to or wider than the upper tube, an output opening at a lower side of the lower portion of the compression tube, and moisturizing means active to introduce a fluid into the compression tube during compressing operation on the waste paper an converting the waste paper to pulped paper, the moisturizing means including a plurality of fluid inlets spaced circumferentially around an upper side of the compression tube and a fluid source connected to the fluid inlets, and a conveyer belt disposed between front and rear rollers, the front roller mounted on a horizontally disposed first axial shaft disposed proximate a lower side of an opening provided in a side of the processor casing and the rear roller being mounted on a second axial shaft mounted rearwardly of the output end of the lower tube of the compression section at a higher elevation than the front roller, the conveyer belt active to move the pulped paper output from the compression tube sufficient to turn the rollers for moving the conveyer belt so as to convey the pulped paper to a terminus of the conveyer at the position of the first roller, and a tray positioned outside and below the front opening of the processor casing and receiving the pulped paper output from the compression tube via the conveyer belt.

Also according to the invention, a waste paper processing system may comprise: a driving source, a processor casing having a side opening formed at one side thereof, paper shredding means having an inlet opening thereabove, a substantially funnel-shaped hopper provided at the lower side of the paper shredding means, a rotor comprising a first annular ring rotatably driven by the driving source and positioned to correspond to an outlet side of the hopper, the first annular ring joined to a main shaft, axially aligned with the hopper and extending downward vertically therefrom, by a plurality of spokes radially projected from an upper side of the main shaft, the main shaft rotatably driven according to rotation of the first annular ring and further including a screw blade spirally projected from a lower side of the main shaft to a predetermined circumference, the screw blade terminating at an lower end of the main shaft, a scraper comprising an second annular ring rotatably driven by the driving source and positioned at a lower side of the first annular ring, the second annular ring receiving therethrough a portion of the main shaft below that received by the first annular ring and above that supporting the screw blade, the second annular ring mounting a plurality of scraper blades projected radially inward from the annular ring, ends of the scraper blades being downwardly oriented and positioned so as to pass closely proximate a leading edge of the screw blade where the leading edge is projected from the lower side of the main shaft according to rotation of the second annular ring and of the screw blade, a compression tube portion receiving a predetermined length of the main shaft mounting the screw blade, the screw blade active for gathering shredded paper from the paper shredding means and forcing the shredded paper into the compression tube, an inner circumference of the compression tube closely accommodating an outer circumference of the screw blade and having a serrated surface at least at an upper side thereof corresponding to a received length of the main shaft, a lower portion of the compression tube portion having an inner circumference smaller than the upper side thereof by a predetermined degree, an output opening at a lower side of the lower portion of the compression tube, and moisturizing means active to introduce a fluid into the compression tube during compressing operation on the waste paper an converting the waste paper to pulped paper, the moisturizing means including a plurality of fluid inlets spaced circumferentially around an upper side of the compression tube and a fluid source connected to the fluid inlets, and a conveyer assembly comprising: a first tray including a bottom plate having a front side projecting perpendicularly to the bottom plate, two side members set on each longitudinal side of the bottom plate and projecting perpendicular thereto in the same direction as the front side, each of the side members having a plurality of the shaft support grooves formed in an upper side thereof such that each of the shaft support grooves formed in one of the side members has a corresponding, opposing shaft support groove formed in the other side member, a hinge provided at a base of the front side and attached to a lower side of the side opening of the processor casing, the first tray positionable vertically or horizontally relative the side opening via the hinge for opening or closing the side opening, the first axial shaft supporting the front roller is set between a pair of corresponding shaft support grooves of the side members of the first tray, a conveyer belt mounted between front and rear rollers, a first axial shaft rotatably supporting the front roller being is received in shaft support grooves provided at either side of a pivotably mounted tray, a second axial shaft rotatably supporting the rear roller being positionally fixed behind the outlet opening of the compression tube such that, in a state where the first tray is vertically positioned for closing the side opening of the processor casing, the conveyer belt is slack, and hangs loosely between the first and second rollers and, in a opened, or substantially horizontal position of the first tray, the front roller is moved forward according to movement of the shaft support grooves of the first tray so as to tighten the conveyer belt, the conveyer belt, in the tightened state being active to conduct the pulped paper from the outlet opening of the compression tube to the opened first tray and, according to continued output from the outlet opening of the compression tube, the pulped paper introduced to the first tray is pushed into a second tray positioned under the opened first tray.

And, according to a final aspect of the present invention, a waste paper processing system, comprises: a processor casing defining therein a shredding chamber, an inclined paper inlet opening provided on an upper side of the casing, a driving power source, first and second rotatably driven shafts horizontally arranged parallel to each other and driven by the driving power source so as to rotate in mutually opposite directions, such that the shafts spin outwardly of a center space between the shafts from a paper feeding direction, a plurality of circular blades respectively mounted axially spaced along each of the shafts and having a plurality of teeth portions formed on the circumferences thereof, an orientation of the teeth portions of each of the blades being in a direction of the rotational direction of the blade respectively, a plurality of presser arms mounted on opposing side walls of the shredding chamber so as to be pivotable in the upward direction by a predetermined degree, the presser arms projecting above and perpendicularly to the shafts such that each presser arm is respectively provided above a space between two of the blades of each of the shafts on two opposing sides of the shredding chamber, a plurality of stopper arms projected from the side wall of the shredding chamber perpendicular to and below the shafts directly below and substantially on the same plane as corresponding presser arms such that each of the stopper arms is respectively provided below a space between two of the blades of each of the shafts on two opposing sides of the shredding chamber, and a filter provided at a lower side of the shredding chamber so as to catch paper larger than a predetermined size, the filter formed of a plurality of parallel wire portions arranged parallel to the plane of the blades, a substantially funnel-shaped hopper arranged below the filter so as to receive shredded paper from the shredding chamber, a rotor comprising a first annular ring rotatably driven by the driving source and positioned to correspond to an outlet side of the hopper, the first annular ring joined to a main shaft, axially aligned with the hopper and extending downward vertically therefrom, by a plurality of spokes radially projected from an upper side of the main shaft, the main shaft rotatably driven according to rotation of the first annular ring and further including a screw blade spirally projected from a lower side of the main shaft to a predetermined circumference, the screw blade terminating at an lower end of the main shaft, a sub-hopper positioned below the first annular ring and receiving therethrough an upper portion of the main shaft above that supporting the screw blade, the sub-hopper having an inwardly tapered inner surface having a plurality of stopper hooks projected therefrom, a scraper comprising an second annular ring rotatably driven by the driving source and positioned at a lower side of the sub-hopper, the second annular ring receiving therethrough a portion of the main shaft below that received by the sub-hopper and above that supporting the screw blade, the second annular ring mounting a plurality of scraper blades projected radially inward from the annular ring, ends of the scraper blades being downwardly oriented and positioned so as to pass closely proximate a leading edge of the screw blade where the leading edge is projected from the lower side of the main shaft according to rotation of the second annular ring and of the screw blade, a compression tube portion receiving a predetermined length of the main shaft mounting the screw blade, the compression portion comprising, an inner circumference closely accommodating an outer circumference of the screw blade and having a serrated surface at least at an upper side thereof corresponding to a received length of the main shaft, a lower portion of the compression tube portion having an inner circumference smaller than the upper side thereof by a predetermined degree, a gap, provided between the upper and lower sides of the compression tube portion, the gap formed as a circular groove between the upper and lower tubes and having a diameter equal to or wider than the upper tube, a tapered portion tapered at a predetermined angle and formed between the gap and the lower portion of the compression tube, an output opening at a lower side of the lower portion of the compression tube, moisturizing means active to introduce a fluid into the compression tube during compressing operation on the waste paper, the moisturizing means comprising: a fluid source, a plurality of fluid inlets spaced circumferentially around an upper side of the compression tube, a first photo-sensor arranged on the plane of a lower side of the paper inlet opening and active to detect completion of insertion of paper into the paper inlet opening and output a first signal indicative thereof, a second photo-sensor provided at a lower side of the hopper for detecting completion of shredding operation by the shredding section and outputting a second signal indicative thereof, an electronically operable valve interposed between the fluid source and the fluid inlets, fluid lines connected the fluid source to the fluid inlets respectively via the electronically operable valve, a control unit receiving the first and second signals and, upon receiving the first signal, outputting the a first command to the electronic valve for turning on electronic valve such that fluid is allowed to flow from the fluid tank to the fluid inlets via the fluid lines for introducing a predetermined amount of fluid to the compression tube via the fluid inlets, for effecting moistening of the shredded paper for forming pulped paper, and, upon receiving the second signal, transmitting a second command to the electronic valve for closing same so as to cease the flow of fluid to the fluid outlets, a conveyer belt disposed between front and rear rollers, the front roller mounted on a horizontally disposed first axial shaft disposed proximate a lower side of an opening provided in a side of the processor casing and the rear roller being mounted on a second axial shaft mounted rearwardly of the output end of the lower tube of the compression section at a higher elevation than the front roller, the conveyer belt active to move the pulped paper output from the compression tube sufficient to turn the rollers for moving the conveyer belt so as to convey the pulped paper to a terminus of the conveyer at the position of the first roller, and a tray positioned outside and below the front opening of the processor casing and receiving the pulped paper output from the compression tube via the conveyer belt.

BRIEF DESCRIPTION OF THE DRAWINGS

In the drawings:

FIG. 14 is a cross-sectional view of a compression portion of a waste paper processing system according to a second embodiment of the invention;

DESCRIPTION OF THE PREFERRED EMBODIMENT

Figure 1:
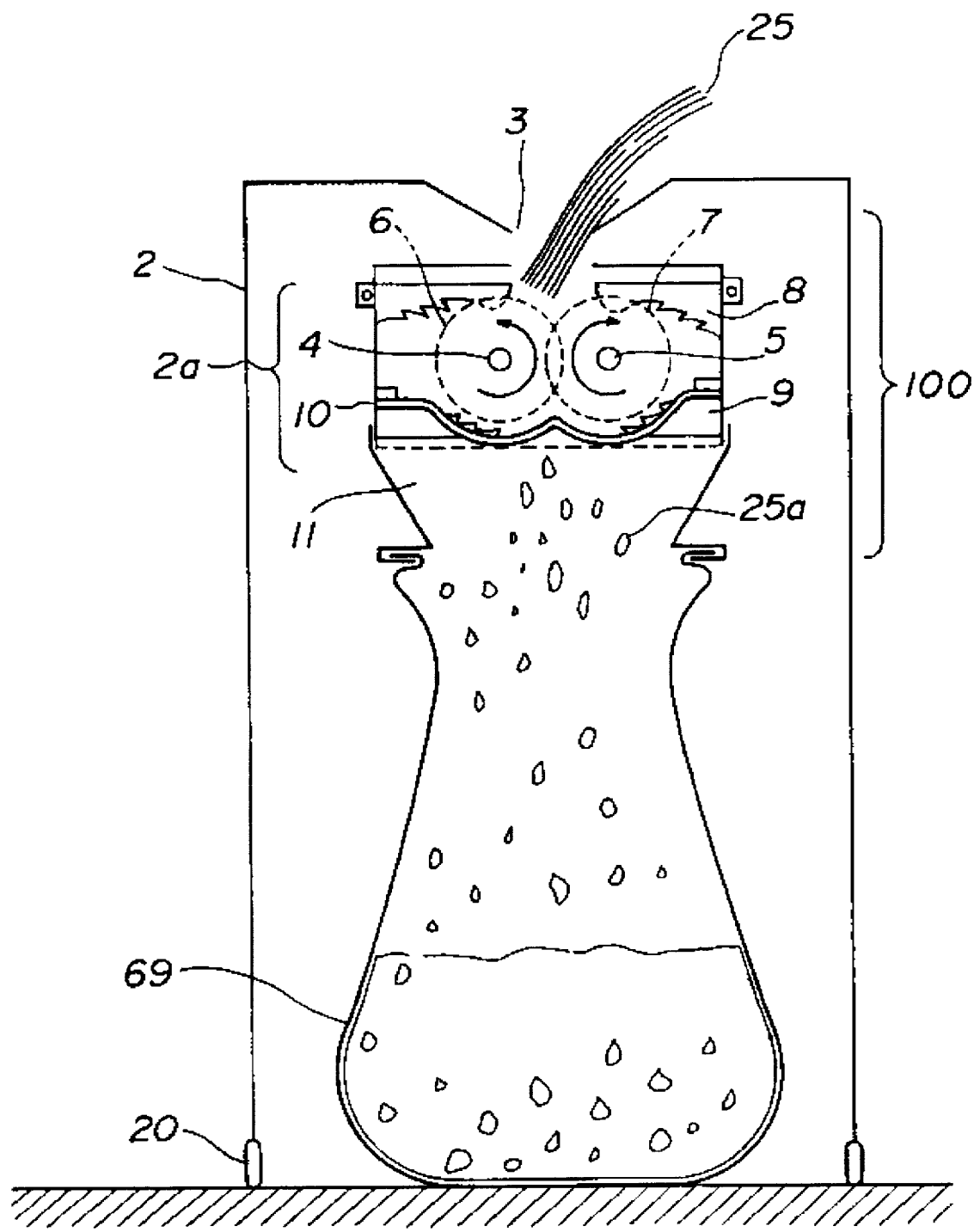
FIG. 1 is a cross-sectional view of a first embodiment of a waste paper processing system according to the invention.

Referring now to the drawings, particularly to FIG. 1, a waste paper processing system 1 according to a first embodiment of the invention will be explained in detail.

Figure 2:
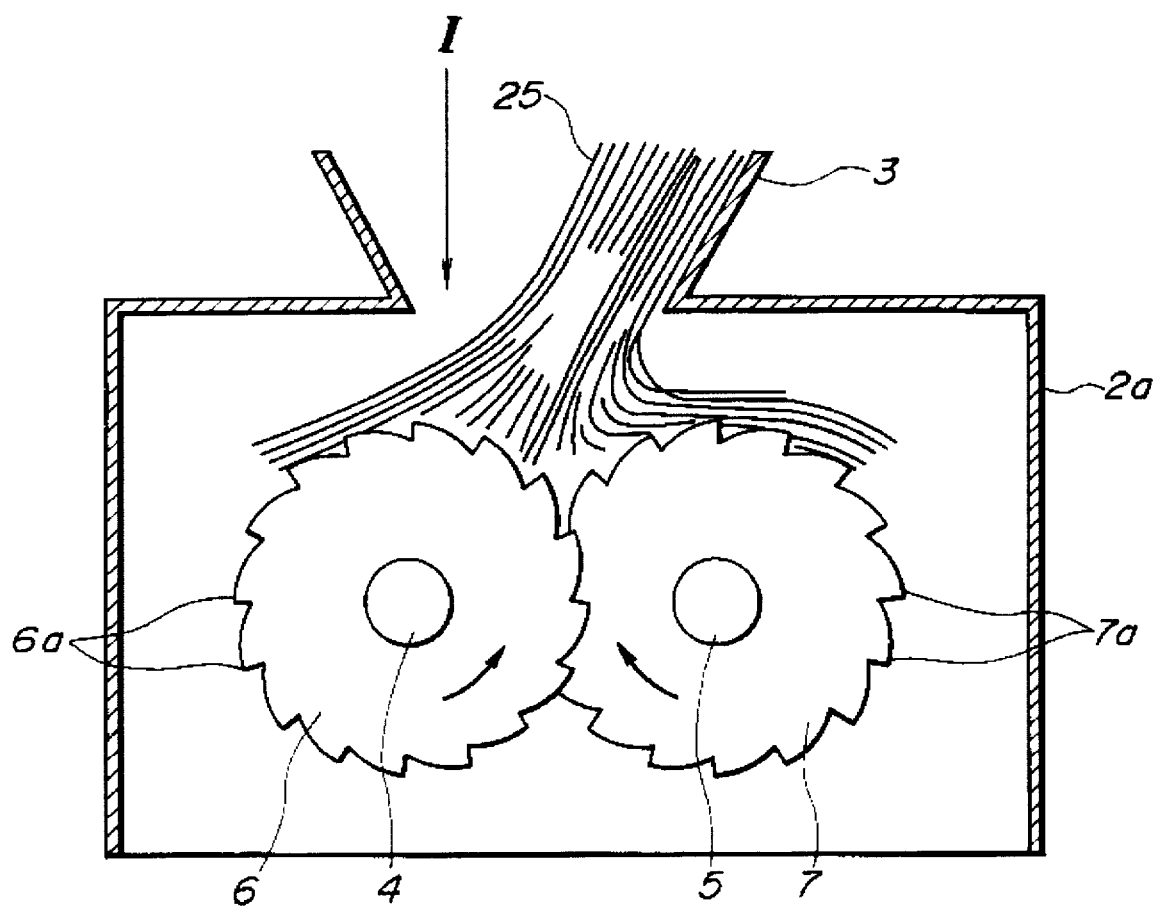
FIG. 2 is an enlarged frontal view of a blade and paper inlet arrangement of the first embodiment.

As may be seen in FIG. 1, the waste paper processing system 1 of the first embodiment comprises a shredding section 100 within a processor casing 2 defining therein a shredding chamber 2a and having an inclined paper inlet opening 3 provided on an upper side thereof. The processor casing may be additionally provided with wheels 20 at bottom corners thereof for allowing the apparatus to be easily moved. Within the shredding chamber 2a, two rotatably driven shafts 4 and 5 are horizontally arranged parallel to each other, the shafts are driven by driving means (not shown) so as to rotate in mutually opposite directions, away from a space defined between the shafts 4 and 5, as shown by the arrows in FIG. 1. A plurality of circular blades 6, 6, . . . and 7, 7 . . . are respectively mounted on each of the shafts 4 and 5. As seen in FIG. 2 the circular blades 6 and 7 have a plurality of teeth portions 6a . . . , 7a . . . formed on the circumferences thereof. The teeth portions 6a of the circular blades 6 mounted on the left shaft 4 are oriented counterclockwise while the teeth portions 7a of the circular blades 7 mounted on the right hand shaft 5 are oriented clockwise. Thus, from a paper feeding direction (i.e the downward direction of arrow I in FIG. 2) the teeth portions 6a, 7a spin outwardly of a center space between the shafts 4 and 5.

Thus, as seen in FIG. 2, according to the opposing rotations of the blades 6, 7 away from a center space between the shafts 4 and 5, that is, viewing FIG. 2, the left side shaft 4 rotates in a counterclockwise direction while the right side shaft 5 rotates in a clockwise direction, waste paper 25 introduced through the paper inlet opening 3 is punctured and ripped in opposing directions, wrapped around the blades 6 and 7 to be drawn between the blades 6 and 7 from beneath. Thus, shredding is accomplished with ripping of the paper 25 rather than only cutting or slicing thereof as with conventional paper shredders. This reduces a volume of shredded paper output from the processing system and enhances document security by thoroughly ripping and tearing paper documents introduced into the shredding portion of the waste paper disposal system 1 of the invention.

Further to the above, in order to enhance the feeding and motion of paper 25 fed into the shredding chamber 2a, a driving speed of one of the shafts 4 or 5 may be varied to be driven slower than the other of the shafts 4 or 5. A speed difference of 20–30% between the shafts has been determined by the inventors a preferable for enhancing feeding and shredding efficiency of the waste paper disposal system 1 according to the invention. In other words to the preferred embodiment, the left shaft 4 is driven at a speed 30% lower than that of the right shaft 5. Further to this, it will be noted in FIG. 2 that the paper inlet 3 is positioned so as to direct paper fed into the shredding chamber 2a, toward the slower shaft 4. This feature also enhances the speed and efficiency of paper disposal processing. It will be noted that the shafts 4 and 5 may be driven by different motors (not shown) respectively or, alternatively may be both driven by a single motor (not shown) via appropriate gearing, or the like.

Figure 3A:
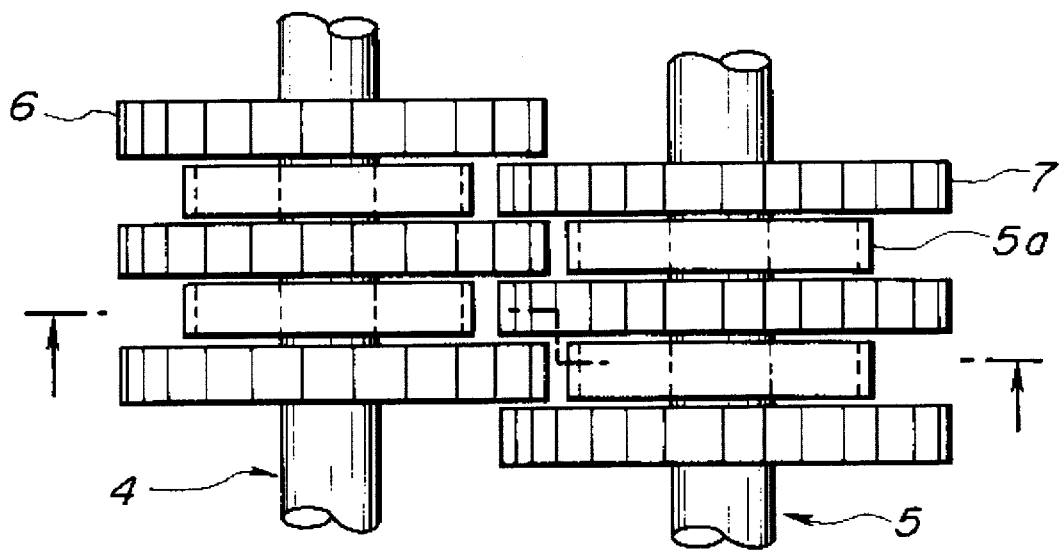
FIGS. 3(A), 3(B) show views of a shaft and blade arrangement of the first embodiment provided with cylindrical shaft guard sections.
Figure 3B:
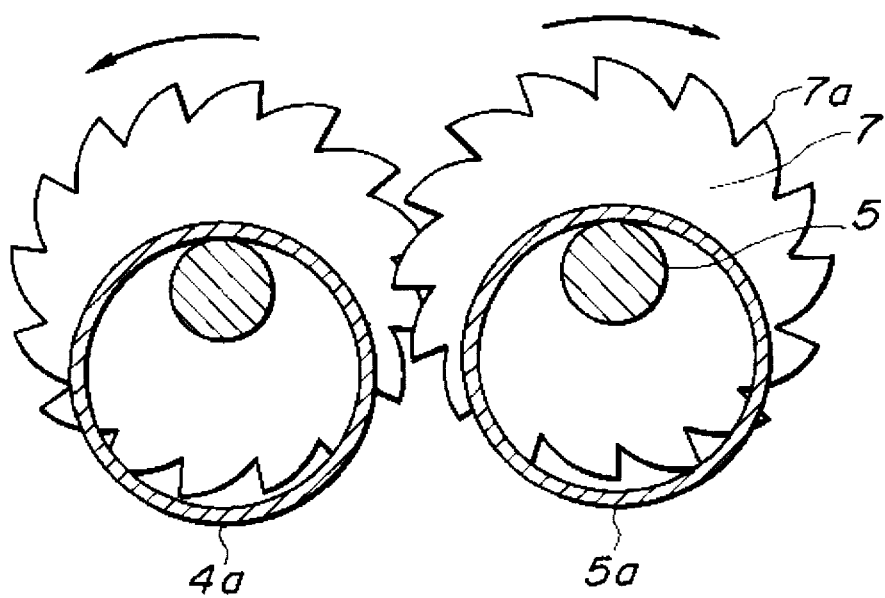
Figure 4A:
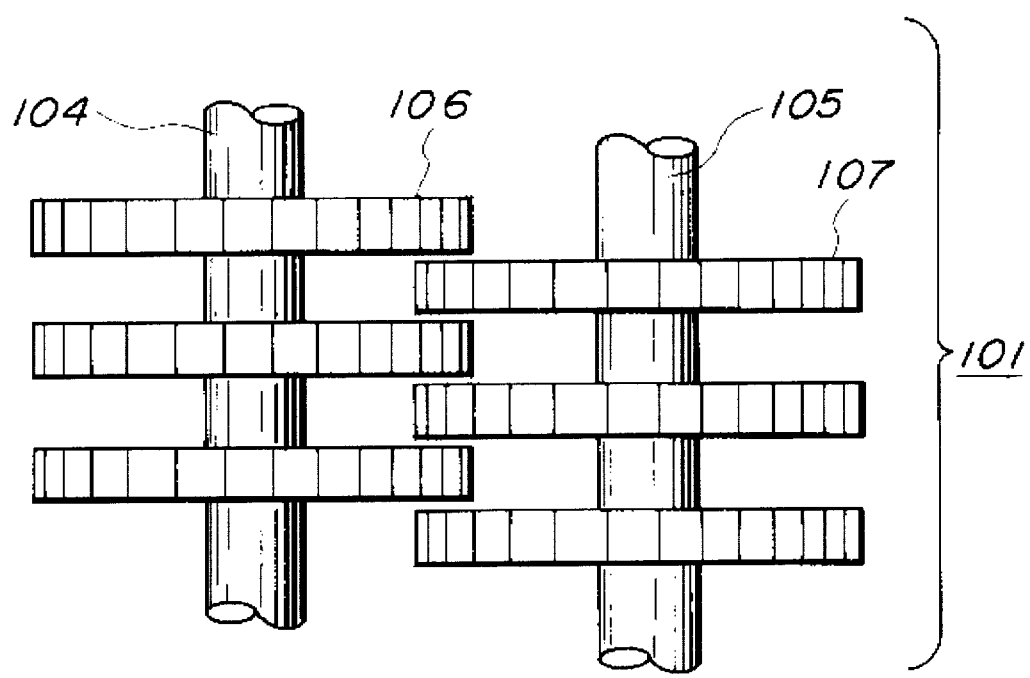
FIGS. 4(A), 4(B) show blade and shaft arrangements of a conventional waste paper processing system illustrating a drawback thereof.
Figure 4B:
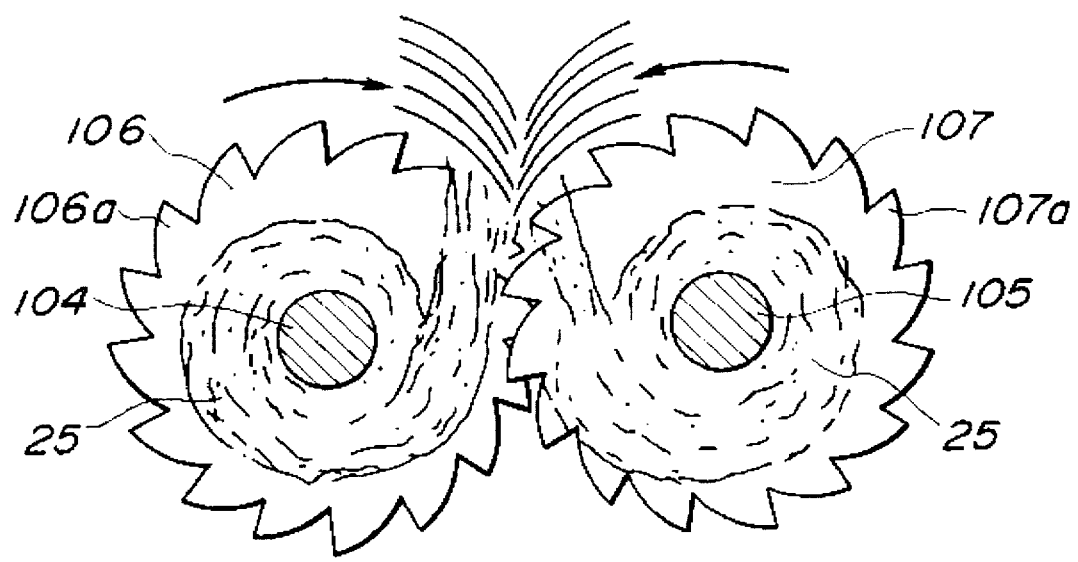

In order to prevent clogging of the shafts 4 and 5 when a large volume of paper 25 is to be shredded, cylindrical shaft guard sections 4a, 5a are provided so as to surround the shaft 4 or 5 in the space between the blades 6, 6 . . . or 7, 7 . . . as seen in FIGS. 3(A) and 3(B). Referring to FIGS. 4(A) and 4(B), when feeding a large volume of paper 25 into a conventional shredder 101 it may be seen that paper 25 is drawn to the axial position of the shafts 104 and 105 such that clogging or jamming of the shredder may occur. According to the present invention, as seen in FIGS. 3(A) and 3(B), since the shafts 4 and 5 are rotated in opposite directions away from a space defined between the shafts (as viewed from the paper feeding direction), and since the cylindrical shaft guard section 4a . . , 5a. . . having an inner circumference larger than the outer circumference of the shafts 4 and 5 by a predetermined degree, are provided to prevent wrapping of paper 25 around the axial position of the shafts, and jamming and/or clogging is prevented and smooth reliable shredding operation may be assured.

Figure 5A:
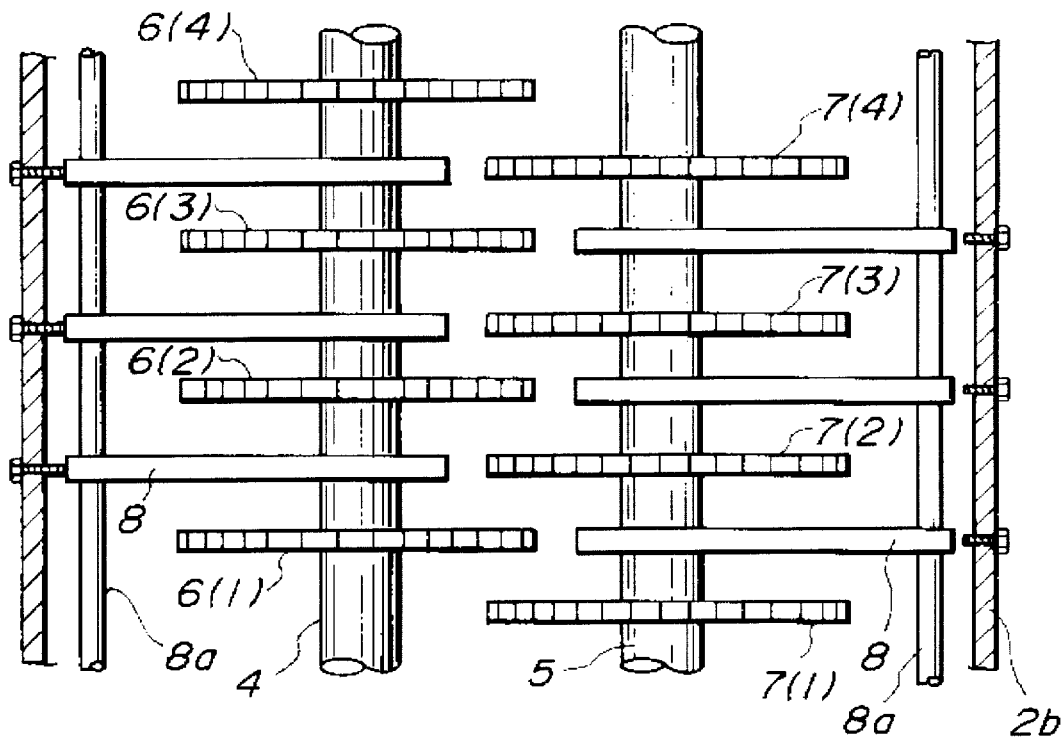
FIGS. 5(A), 5(B) show plan and frontal views respectively of a presser arm arrangement according to the first embodiment.
Figure 5B:
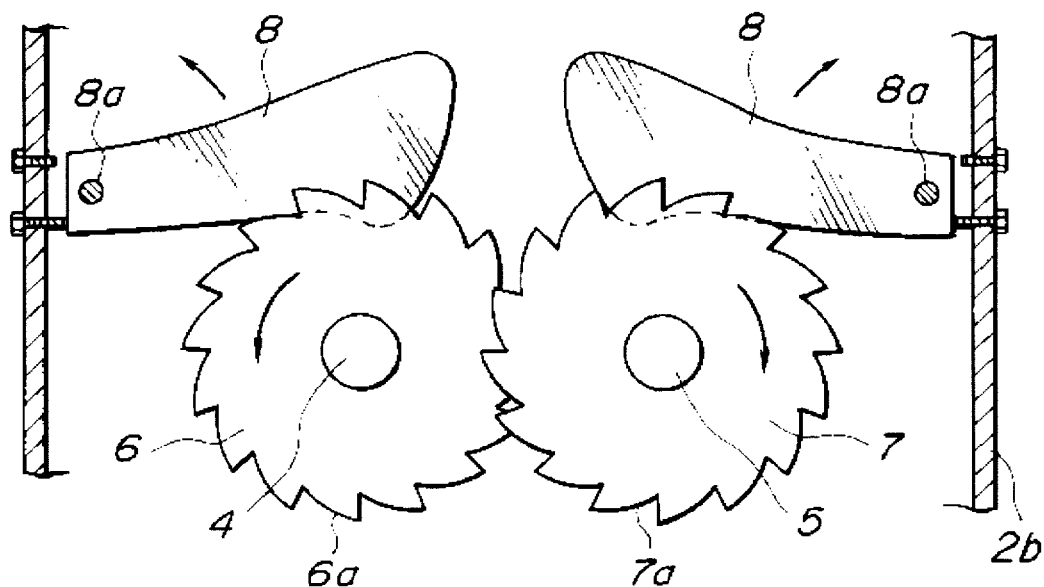

Further, referring to FIG. 5(A) and 5(B), in order to enhance the above described shredding operation, anchored to side walls 2b of the paper shredding chamber 2a in which the circular blades 6 and 7 are mounted, positioned in between the blades 71, 72 . . . mounted on the shaft 5 and between the blades 61, 62 . . . mounted on the shaft 4, presser arms 8 are provided. The presser arms 8 are mounted at on pivot shaft 8a so as to be pivotable in the upward direction by a predetermined degree. Referring to FIG. 5(A), it can be seen that the presser arms 8 are provided respectively between each of the blades 6 and 7 mounted on the shafts 4 and 5. Thus, during shredding, when the paper is drawn around the blades 6 and 7 and up through the space between the shafts 4 and 5, the presser arms 8 hold the shredding paper 25 at the level of the blades 6, 7 such that the paper 25, after being partially shredded is not blown above the level of the blades 6,7 by air currents or the like generated due to rotation of the plurality of blades 6 . . . and 7 . . . Thus, even when a high volume of paper 25 is to be shredded, the presser arms 8 maintain downward pressure on the bulk of the paper for steadily feeding the paper into the blades 6, 7 of the shredding chamber 2, assuring that the waste paper 25 is thoroughly and completely shredded.

Figure 6:
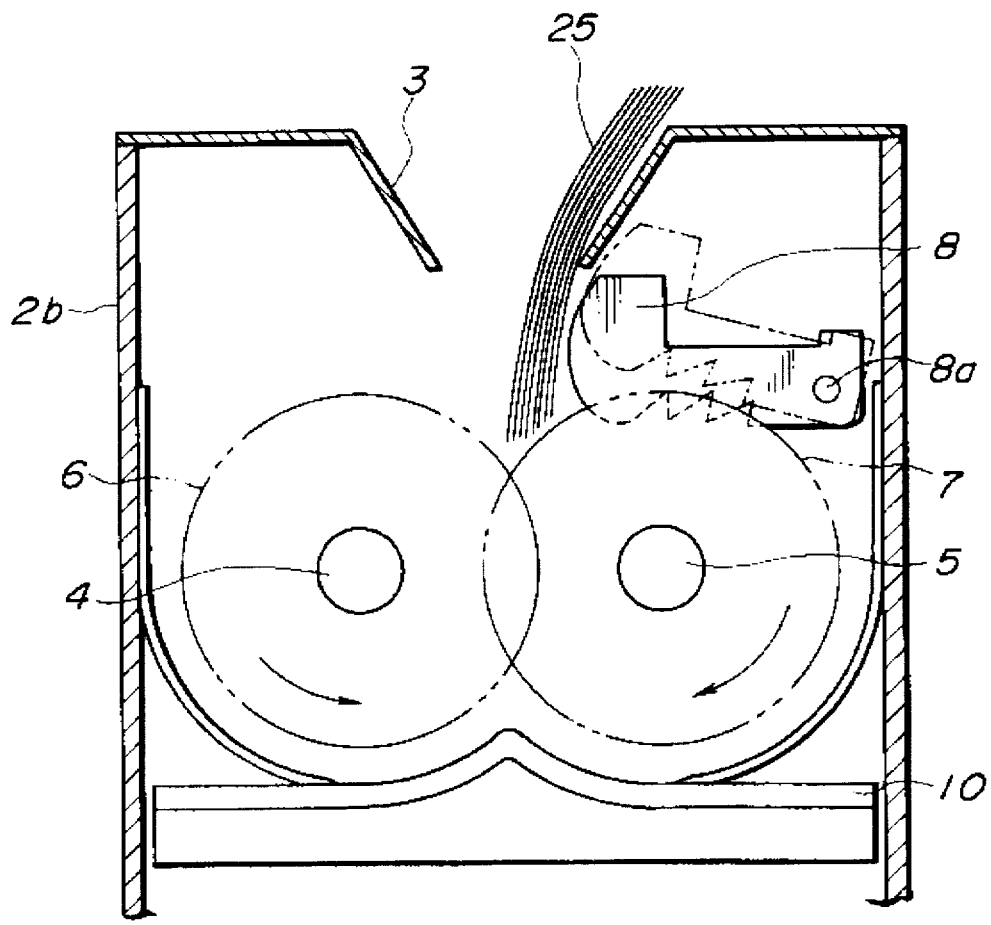
FIG. 6 shows a frontal view of a shredding section of the invention explaining operation of a preferred construction of the presser arms.
Figure 7:
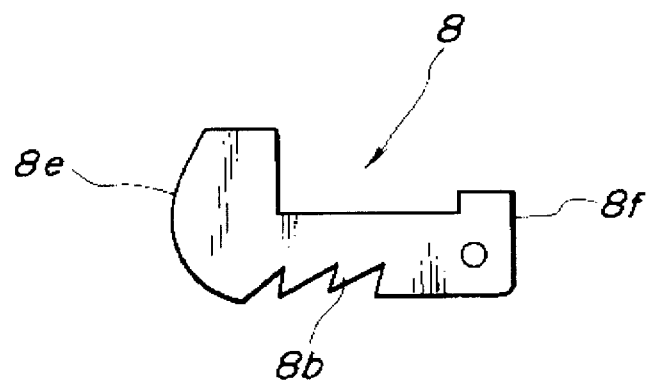
FIG. 7 shows details of a presser arm according to the preferred embodiment.
Figure 8:
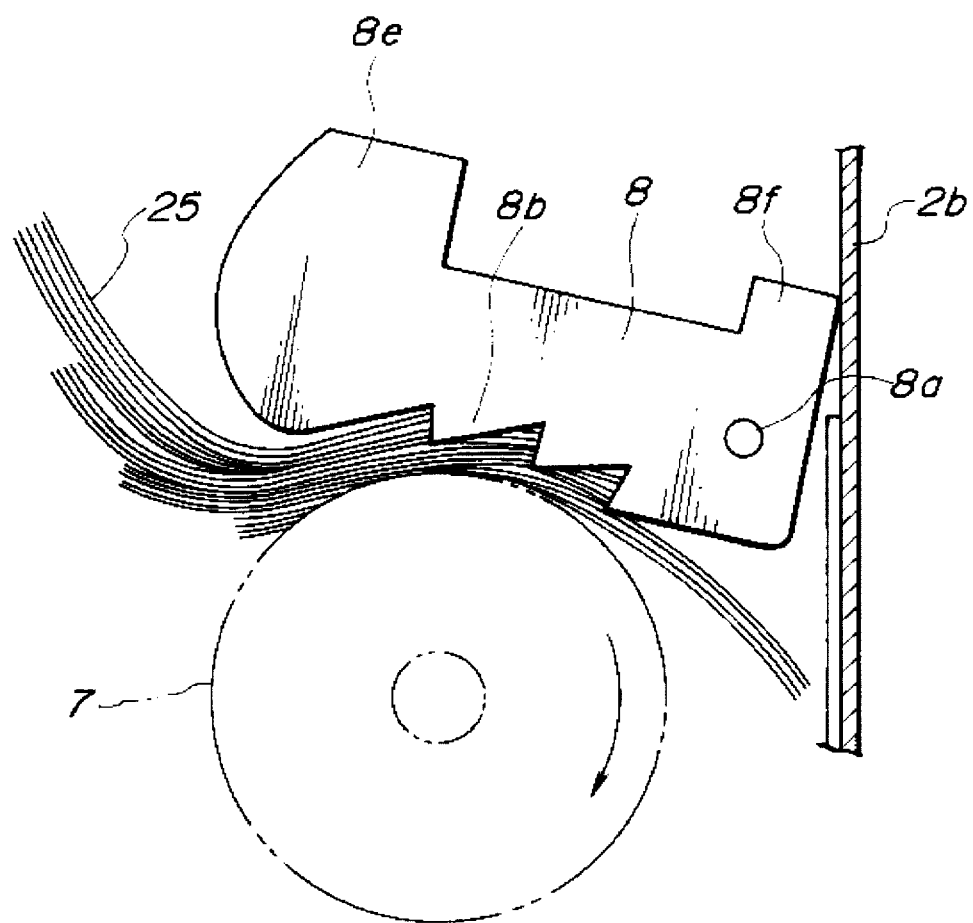
FIG. 8 shows an explanatory view of a shredding operation of the invention illustrating the advantage of the preferred construction of the presser arms.

According to the preferred embodiment, as seen in FIG. 6 and 7, the presser arms 8 are provided with stepped, or tooth portions 8b on an underside thereof to act as a paper stop for paper being shredded. That is, as best seen in FIG. 8, when paper is drawn around the rotating blades 6 or 7 during shredding operation, edges of the paper 25 being shredded are caught by the edges of the teeth 8b formed in the lower side of the presser arms 8 such that larger pieces of paper are held in proximity to the blades until they have been sufficiently shredded. In addition, the presser arms 8 have an enlarged head portion 8e for providing weight so as to apply pressure to paper 25 being fed into the shredding section 100 and a tail portion 8f for limiting a degree of upward pivotability of the presser arms 8. In addition, although the presser arms 8 are shown commonly mounted on a pivot shaft 8a, alternatively they may be respectively mounted on individual hinges 8g as seen in FIG. 10.

Figure 9A:
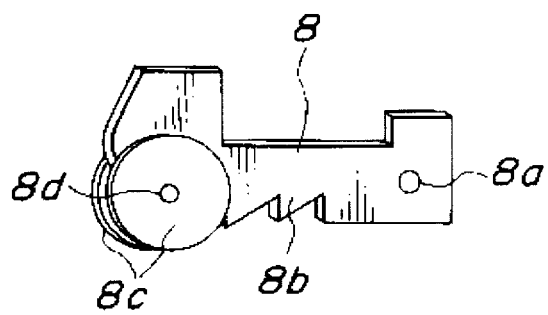
FIGS. 9(A), 9(B) shows the construction of a modification of the presser arms of the preferred embodiment.
Figure 9B:
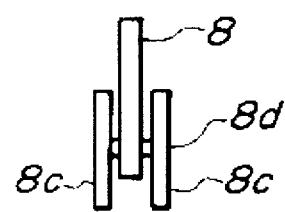
Figure 10:
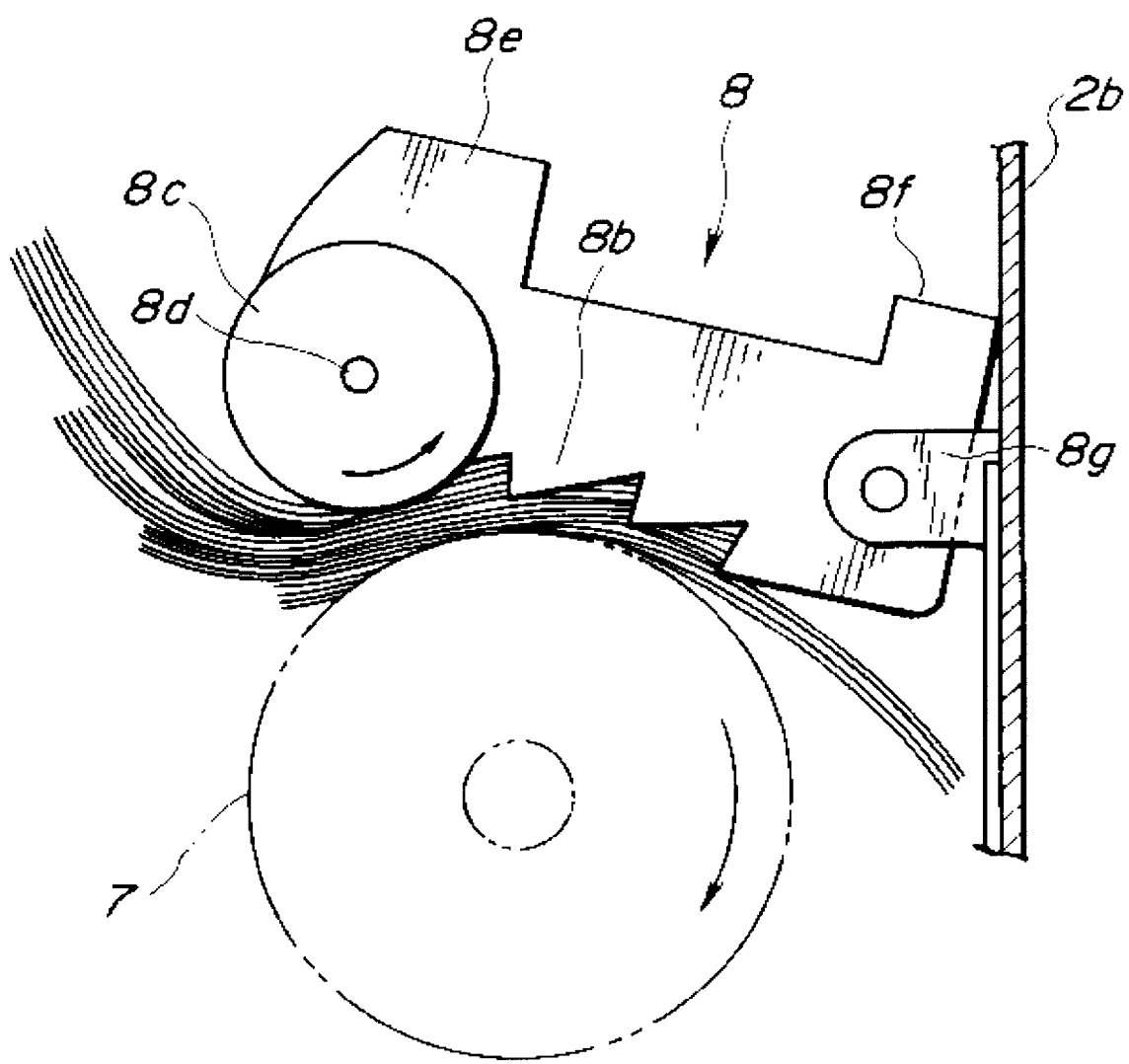
FIG. 10 is an explanatory view of the operation of the modified presser arms of FIG. 9.

Alternatively, referring to FIGS. 9 and 10, rotatably mounted presser wheels 8c may be mounted at the end of each of the presser arms 8. As seen in FIGS. 9(A) and 9(B), the presser wheels are mounted on a shaft 8d such that two presser wheels 8c, 8c are mounted, one on each side of each of the presser arms 8. Thus, as seen in FIG. 10, when large volumes of paper are loaded into the shredder, the presser arms 8 may retain the paper 25 while the freely rotatable presser wheels 8c allow gradual feeding of the paper 25 to be shredded. In addition, it will be noted that the pivotable presser arms 8 may be biased to a horizontal orientation by a spring (not shown), or the like, or alternatively, a weight of the presser arms 8 may be determined so as to provide sufficient pressing force against the paper 25 so as to assure feeding of the paper 25, and so as to orient themselves horizontally after shredding of the paper 25 is accomplished.

Figure 11A:
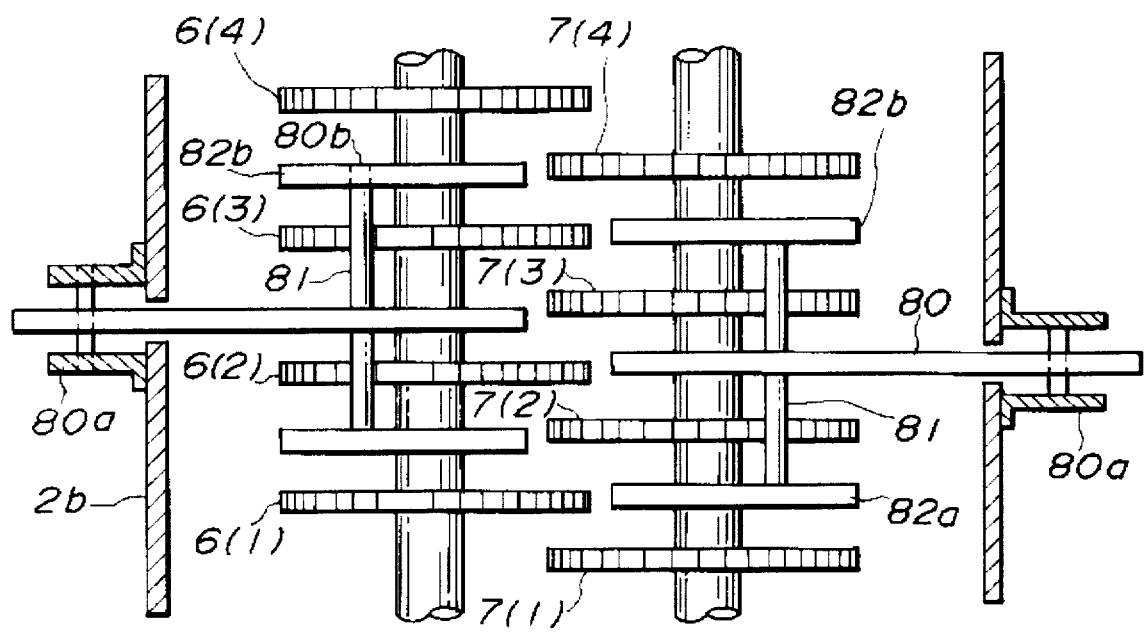
FIGS. 11(A), 11(B) show plan and frontal views respectively of another modification of a presser arm arrangement according to the invention.
Figure 11B:
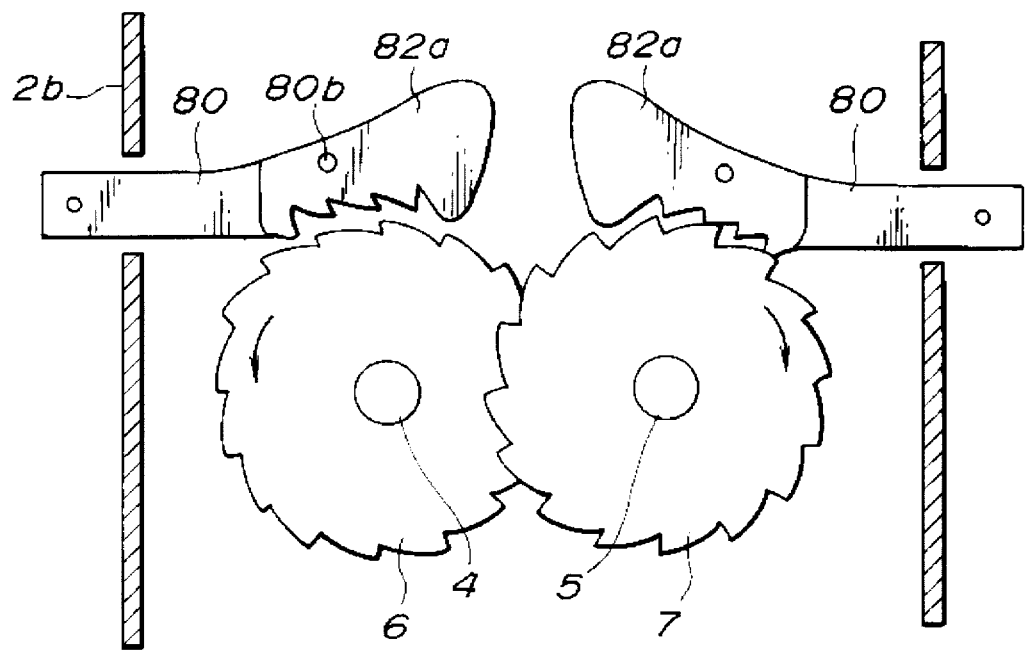

FIG. 11(A) and 11(B) show an alternative construction of the presser arms 8. According to this modification, a main presser arm 80 is pivotably mounted in a bracket 80a which is provided on an outer side of the wall 2b of the shredding chamber 2a. A shaft 81 is provided perpendicularly to the projecting direction of the main presser arm 80 via an opening 80b provided therethrough. Mounted at each side of the shaft 81, secondary presser arms 82a, 82b are mounted. According to this, and as seen in the drawing, the main presser arm 80 is positioned between two of the blades $6_{(2)}$, $6_{(3)}$. The shaft 81 extends above and to the other side of the blades $6_{(2)}$, $6_{(3)}$ such that one of the secondary presser arms 82a is positioned between the blade $6_{(2)}$ and its adjacent blade $6_{(1)}$ and the other secondary presser arm 82b is positioned between the other blade $6_{(3)}$ and its adjacent blade $6_{(4)}$. Thus, three presser arms 80, 82a and 82b can be mounted via a single main presser arm 80 mounted to the wall 2b of the shredding chamber 2a. The same advantages are available using presser arms 80, 82a, 82b of the above configuration as those obtained with presser arms 8 of the previously described configuration.

In addition to the above, in order to assure efficient and complete shredding is accomplished according to the above-described construction, means is provided for retaining paper 25 which has not been sufficiently shredded in the shredding chamber until such time as complete shredding has been accomplished. These means comprise stopper arms 9 and a filter 10.

Figure 12A:
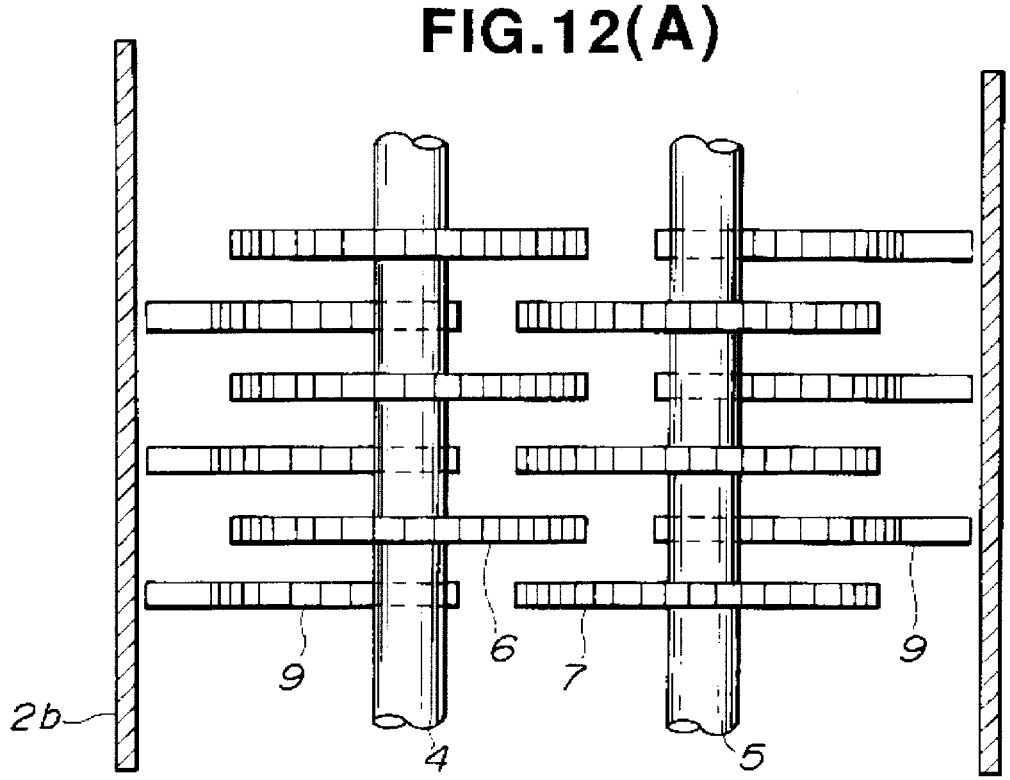
FIGS. 12(A), 12(B) show plan and frontal views respectively of a stopper arm arrangement according to the invention.
Figure 12B:
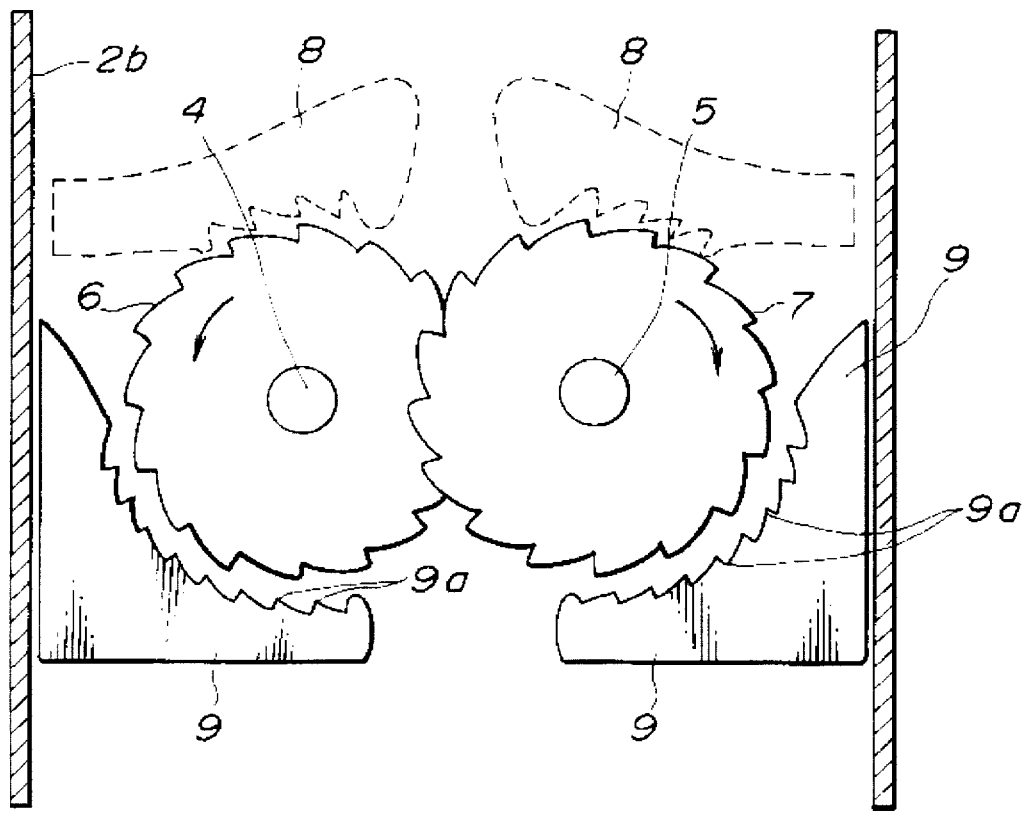

Referring to FIGS. 12(A) and 12(B), it may be seen that the stopper arms 9 are projected from the side wall 2b of the shredding chamber 2a directly below and substantially on the same plane as the corresponding presser arms 8. It will further be noted that, while the presser arms 8 have tooth portions 8b formed on an underside thereof, the stopper arms 9 have tooth portions 9a formed on an upper side thereof. By provision of the stopper arms 9, edge portions of large pieces of paper 25 which have been pulled around the blades 6, 7 according to shredding operation are caught by the tooth portions 9a of the lower stopper arms in much the same manner as by the tooth portions 8b of the upper presser arms.

Thus, relatively larger portions of the paper 25 being shredded are held more or less stationary until complete shredding is accomplished.

Figure 13A:
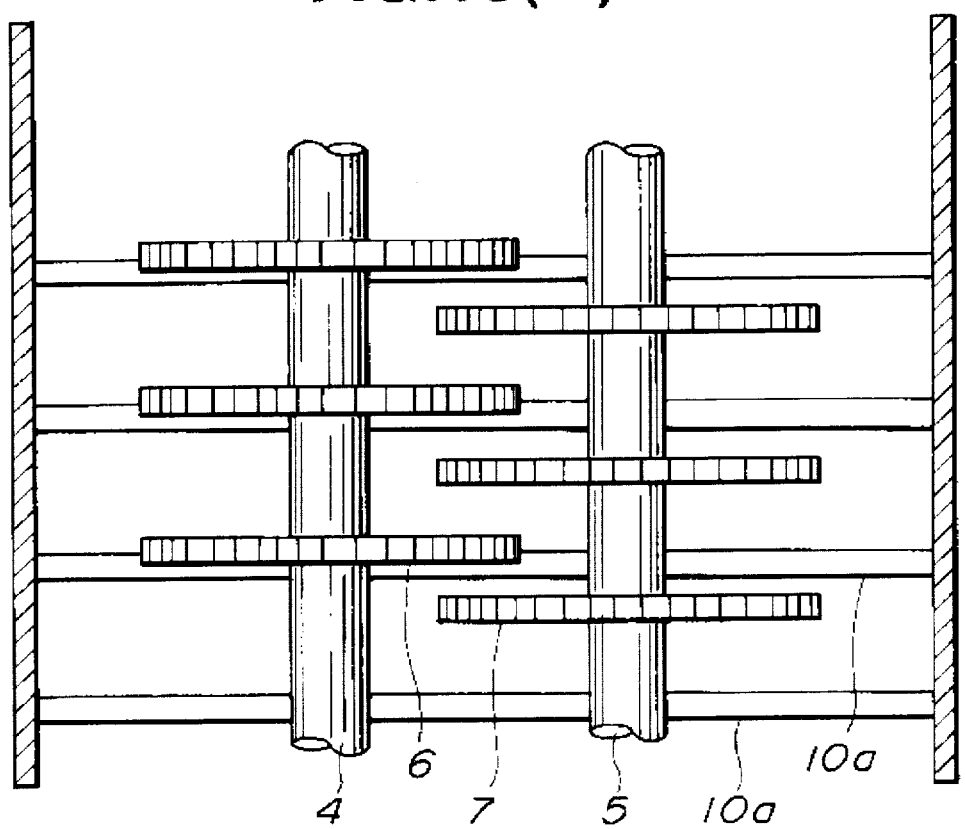
FIGS. 13(A), 13(B) show plan and frontal views respectively of a filter arrangement according to the invention.
Figure 13B:
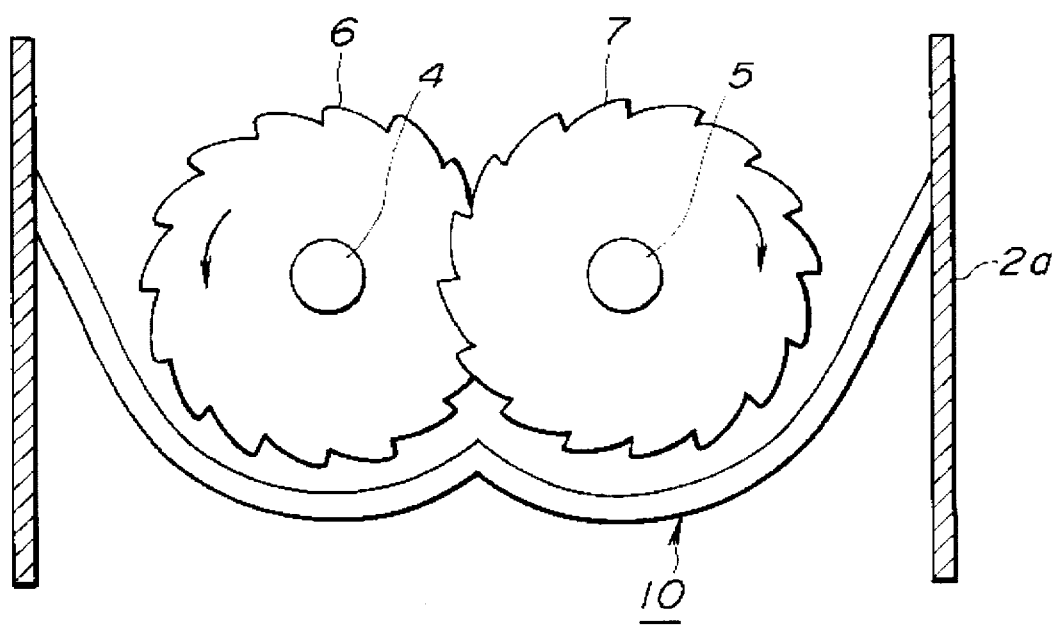

To further, assure that complete shredding is accomplished, a filter 10 is provided at a lower side of the shredding chamber 2a for catching paper 25 which is too large, that is, paper 25 which has not been sufficiently shredded. Referring now to FIG. 13, it may be seen that the filter is formed of a plurality of parallel wire portions 10a arranged parallel to the plane of the blades 6, 7 and the shape of the parallel wire portions 10a is such as to describe a shape of the circumferential overlap of the blades 6 and the blades 7, as seen in FIG. 13(B). The filter 10 is set in a lower portion of the shredding chamber 2a such that the wire portions 10a are arranged between opposing pairs of the stopper arms 9. Thus, with provision of the stopper arms 9 interposed with the wire portions 10a of the filter 10, only pieces of shredded paper 25a which have been shredded to a sufficiently small size may pass below the stopper arms 9 and the filter 10, and complete and thorough shredding of the paper 25 is reliably assured.

Referring again to FIG. 1, after the shredded paper 26a falls through the filter 10 it may then be received by a hopper 11 to which a bag 69 or the like is attached for gathering the shredded paper. According to this, the paper is sufficiently shredded so as to assure document security and facilitate easy recycling. Also, paper shredded according to the above operation is in the form of small compact flakes which are less bulky than the cut strips of paper processed by conventional shredding apparatus.

Hereinbelow, a second embodiment of a waste paper disposal system according to the invention will be described in detail.

According to the present embodiment, the shredding apparatus is identical to that described in the above first embodiment, therefore redundant description will be omitted and like reference numerals will be used to refer to like parts.

According to this embodiment, after the pieces of shredded paper 25a which have been shredded to a sufficiently small size to pass below the stopper arms 9 and the filter 10, the shredded paper 25a is received by a substantially funnel-shaped hopper 11, provided at the lower side of the shredding chamber 2a, to be provided to a compression section 30.

Figure 15A:
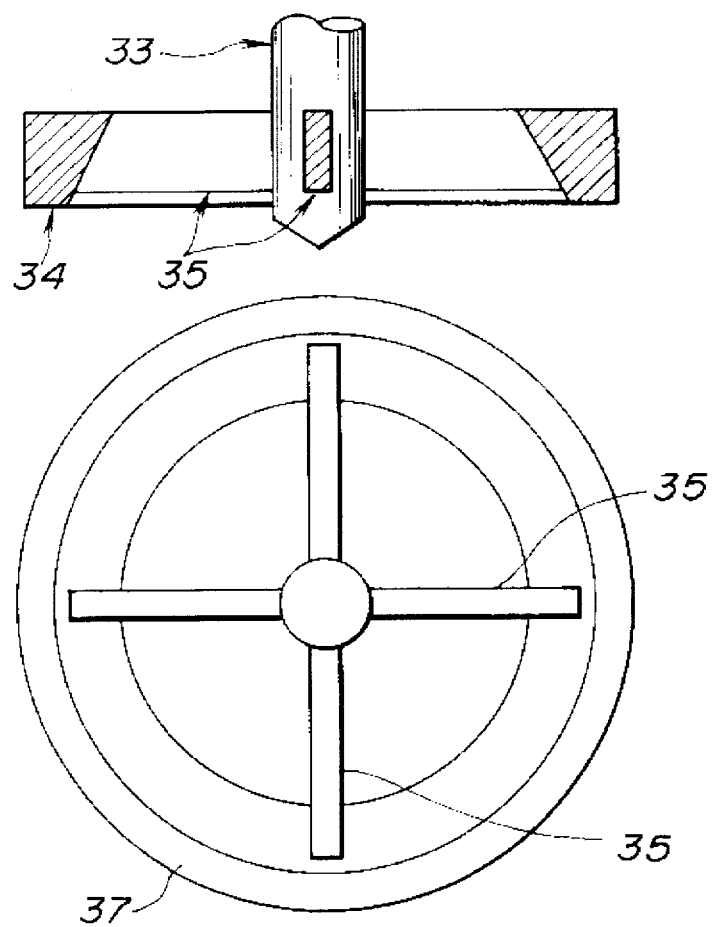
FIGS. 15(A), 15(B) show variations of a structure of a rotor of the compression section of FIG. 14.
Figure 15B:
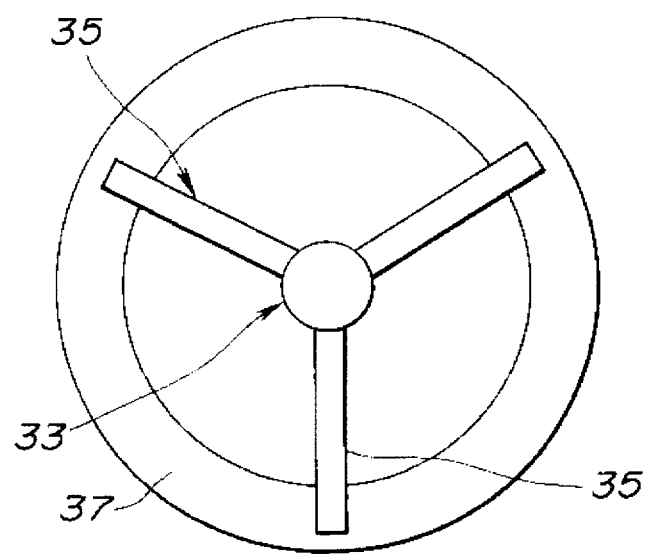

Referring now to FIG. 14, the compression section 30 comprises a rotor 31 having a main shaft 38 axially aligned with the hopper 11. The main shaft 33 extends downwardly through a sub-hopper 39 and partially extends into a compression tube portion 45. As may be seen in FIG. 15, the top side of the main shaft 33 has a plurality of spokes 85 projecting radially outward therefrom and supporting a circular hub 37. As will be noted from FIGS. 15(A) and 15(B), four spokes 35, three spokes 35 or alternatively, five or more spokes 35 may be provided, for suitably distributing the shredded paper 25a into the compression section 30 it is preferable that at least three spokes 85 are utilized. The circular hub 87 may be mounted via a bearing or the like to engage a first drive gear connected with a driving source (not shown) for rotating the hub 37 along with the spokes 35 and the main shaft 33. The circular hub 37 may be driven via teeth (not shown) provided on an outer side thereof for engaging with the first drive gear, or alternatively, may the outer side thereof may be formed as a sprocket having teeth 36 for being driven by a chain (not shown) or the like, as shown in FIG. 16.

Figure 16:
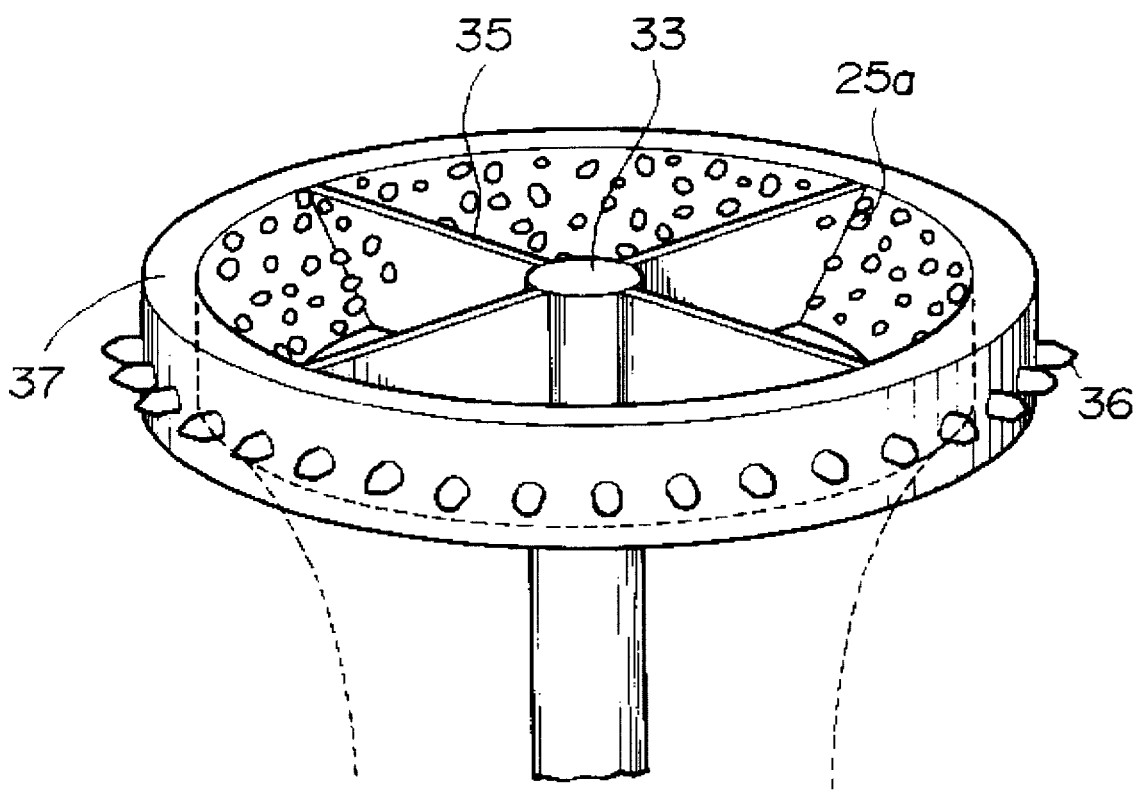
FIG. 16 is a perspective view of a rotor according to the second embodiment.

It will be noted in FIGS. 14 and 16 that the circular hub 37 is formed with an outwardly tapered configuration opposite to the taper of the hopper 11, this allows shredded paper 25a from the hopper 11 to be more quickly drawn into the compression section 30. By their rotation, the spokes 35 serve to separate falling pieces of shredded paper 25a to prevent lumping, or clogging of shredded paper 25a in the compression portion 80.

Figure 17:
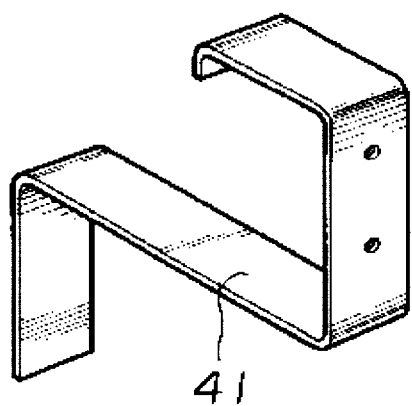
FIG. 17 is a perspective view of a stopper provided in the compression section.
Figure 18:
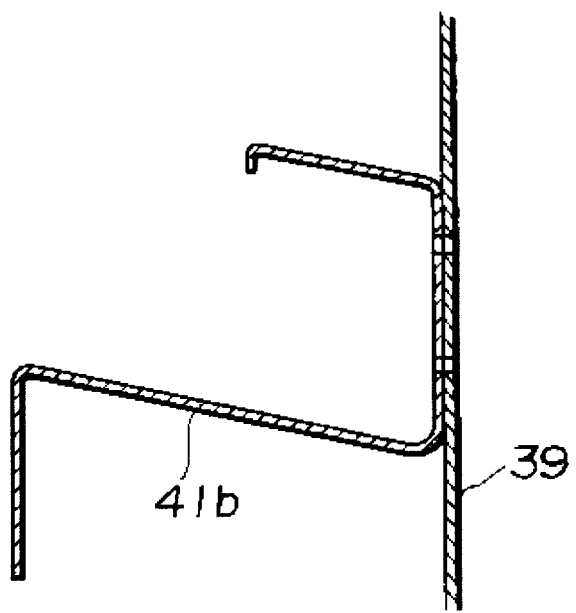
FIG. 18 is a side view of the stopper of FIG. 17 in a mounted state.

As may be seen in FIG. 14, below the rotating circular hub 37 and the spokes 35, the sub-hopper 39 is provided. The sub-hopper 39 is tapered inwardly in the same manner as the hopper 11, that is tapered oppositely to the taper of the circular hub 37. Projected from the side wall of the sub-hopper 39, a plurality of stoppers 41 are provided extending into the interior space of the sub-hopper 39. The stoppers 41 are effective to stop swirling motion of the pieces of shredded paper 25a which fall through the filter 10, through the hopper 11 and past the rotating spokes 35 of the rotor 31 allowing them to come to rest at the bottom of the sub-hopper 39. According to the present embodiment, upwardly oriented stoppers 41a are provided at an upper side of the sub-hopper 39 and downwardly oriented stoppers 41b are provided at a lower side of the sub-hopper 39. The stoppers 41 may be configured as shown in FIGS. 17 and 18 and oriented either in an upward or downward direction as required.

Figure 19A:
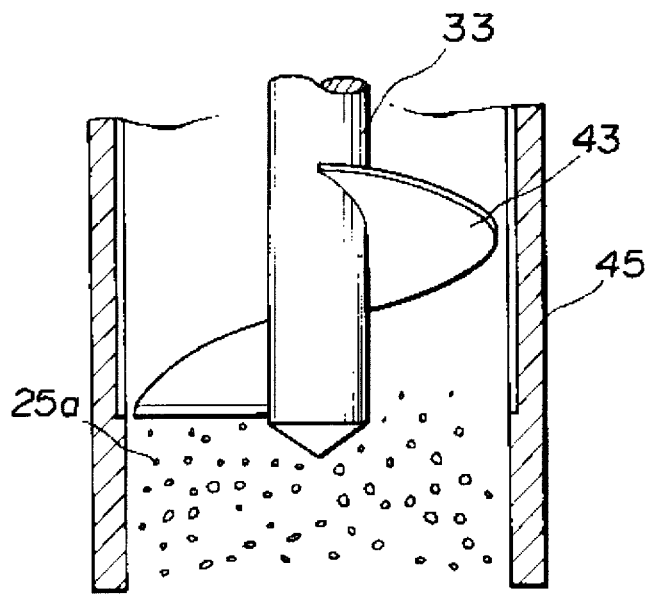
FIGS. 19(A), 19(B) are explanatory diagrams of a compressing operation according to the second embodiment.
Figure 19B:
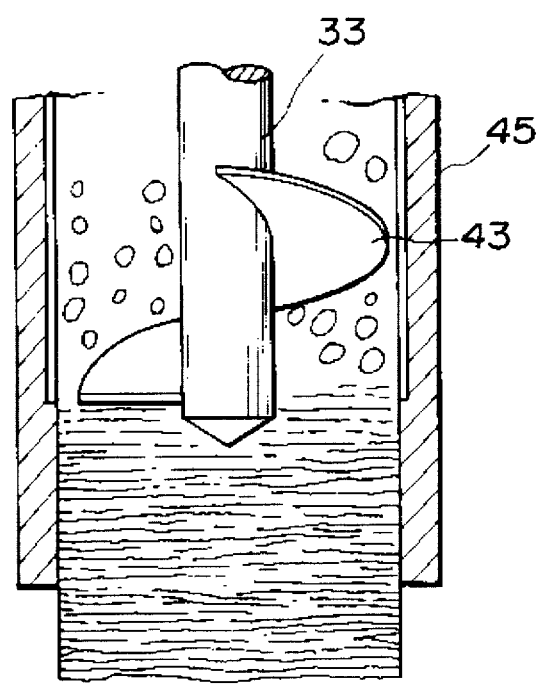
Figure 20:
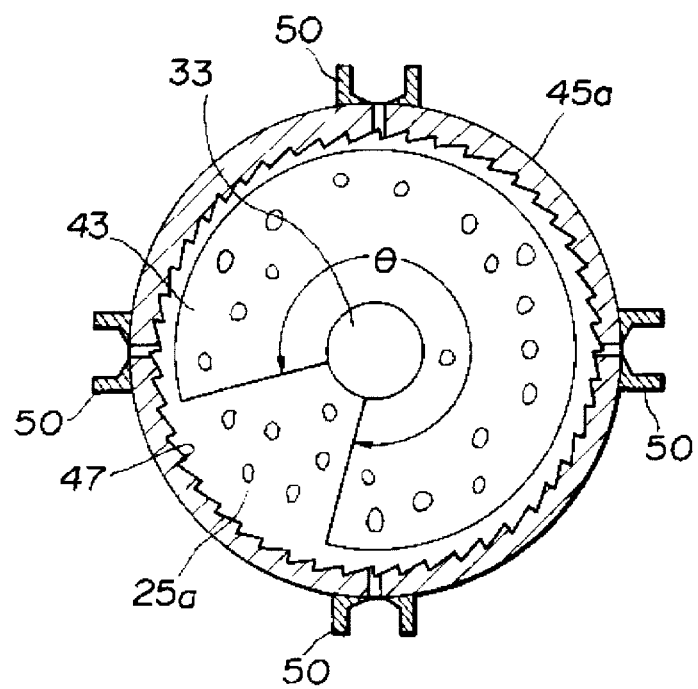
FIG. 20 is a plan view of the compression section during compression operation.
Figure 23:
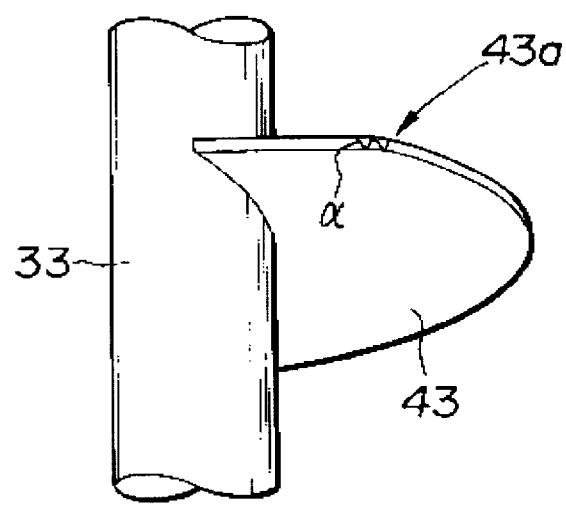
FIG. 23 is an enlarged perspective view of detail of a screw blade portion of the compression section.
Figure 24:
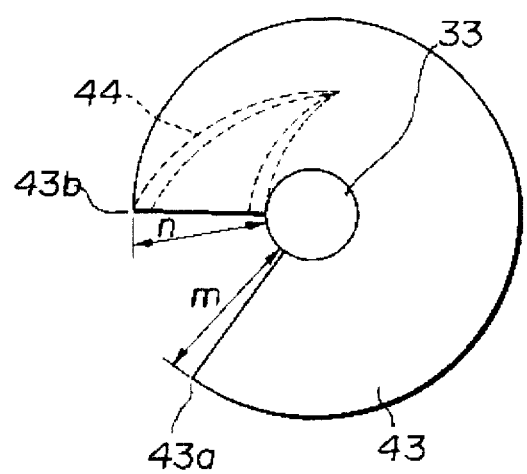
FIGS. 24(A), 24(B) and 24(C) are three explanatory views showing a structure of the screw blade according to the second embodiment of the invention.
Figure 24:
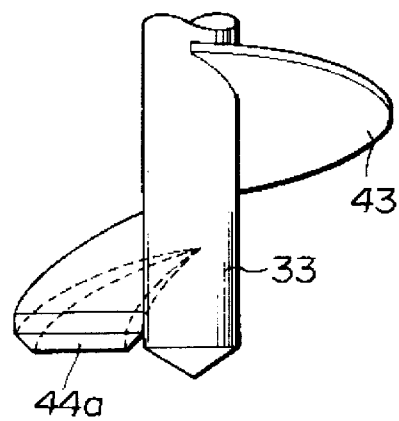
Figure 24:
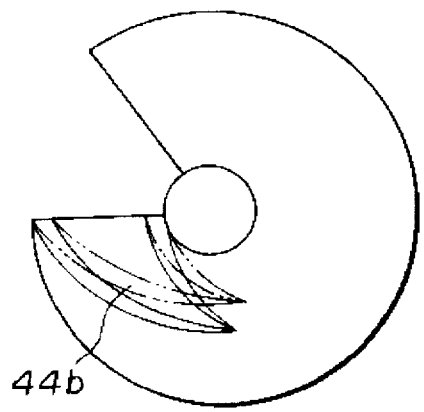

Referring now to FIGS. 19(A) and 19(B), when the pieces of shredded paper 25a reach the bottom of the sub-hopper 39, they pile up and are engaged by a screw blade 43 formed at a lower end of the main shaft 33 so as to be gathered and pushed into the compression tube 45. Viewed in the axial direction of the rotor 31, as seen in FIG. 20 it will be noted that the screw blade which is projected from the main shaft 33 winding around the main shaft 33 in spiral fashion, has a total span θ thereof formed within 360°. that is, no part of the screw blade overlaps itself in the vertical dimension. According to the present embodiment, the screw blade 43 occupies a total area of 300°, although according to the invention, a total screw blade area of between 180° and 360° may be utilized for assuring reliable and rapid compression processing of shredded paper 25a. It is noted that when the screw blade 43 of the compression section 30 occupies greater than 360° in area, processing time is increased and clogging of the screw is more likely to occur. Further, as seen in FIG. 23, a leading edge 43a of an input (upper) side of the screw blade 43 may be beveled at an angle α of 90° or less. Further, as seen in FIG. 24(A)–(C), the leading edge 43a and the trailing (lower) edge 43b of the screw blade 43 project radially from the main shaft 33. Referring to FIG. 24(A), preferably, a radial length n of the trailing edge 43b is smaller than a radial length m of the leading edge 43a by a predetermined amount which may be effected by projecting the leading and trailing edges 43a and 43b from the main shaft 33 at different angles respectively. As may be seen in FIGS. 24(B) and 24(C), a base portion 44 may be formed under the trailing edge 43b of the screw blade 43. The base portion includes a blunt edge 44a projected below the trailing edge 43b and a tapered and curved triangular base 44b projected from the lower surface of the screw blade 43 proximate the trailing edge 43b. Provision of the triangular base 44b aids in uniformly distributing the shredded paper 26a into the compression section 30. According to the present embodiment the screw is driven at between 100 and 150 rpm and processing of approximately 45 kg/hr. of waste paper may be accomplished, although a speed and scale of the above construction may be widely varied for larger and/or smaller volume requirements.

Also, referring again to FIG. 14, mounted between the sub-hopper 39 and the compression section 30, a scraper 40 is mounted for clearing the screw blade 43 of scraps of shredded paper 25a during operation. According to provision of the scraper 40, paper urged into the sub-hopper 39 according to rotation of the circular hub 37 and the spokes 35 cannot pile up in the sub hopper 39, but are smoothly urged down into an area where they may be engaged and drawn in by rotation of the screw blade 43.

Figure 22:
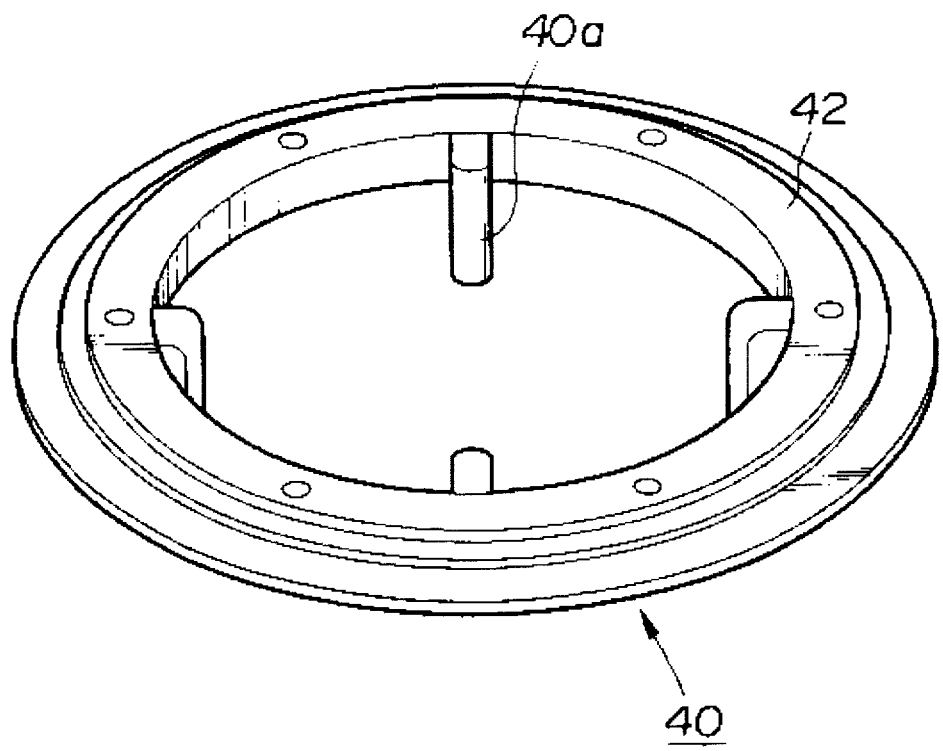
FIG. 22 is a perspective view of a rotary scraper according to a preferred construction of the second embodiment.
Figure 25:
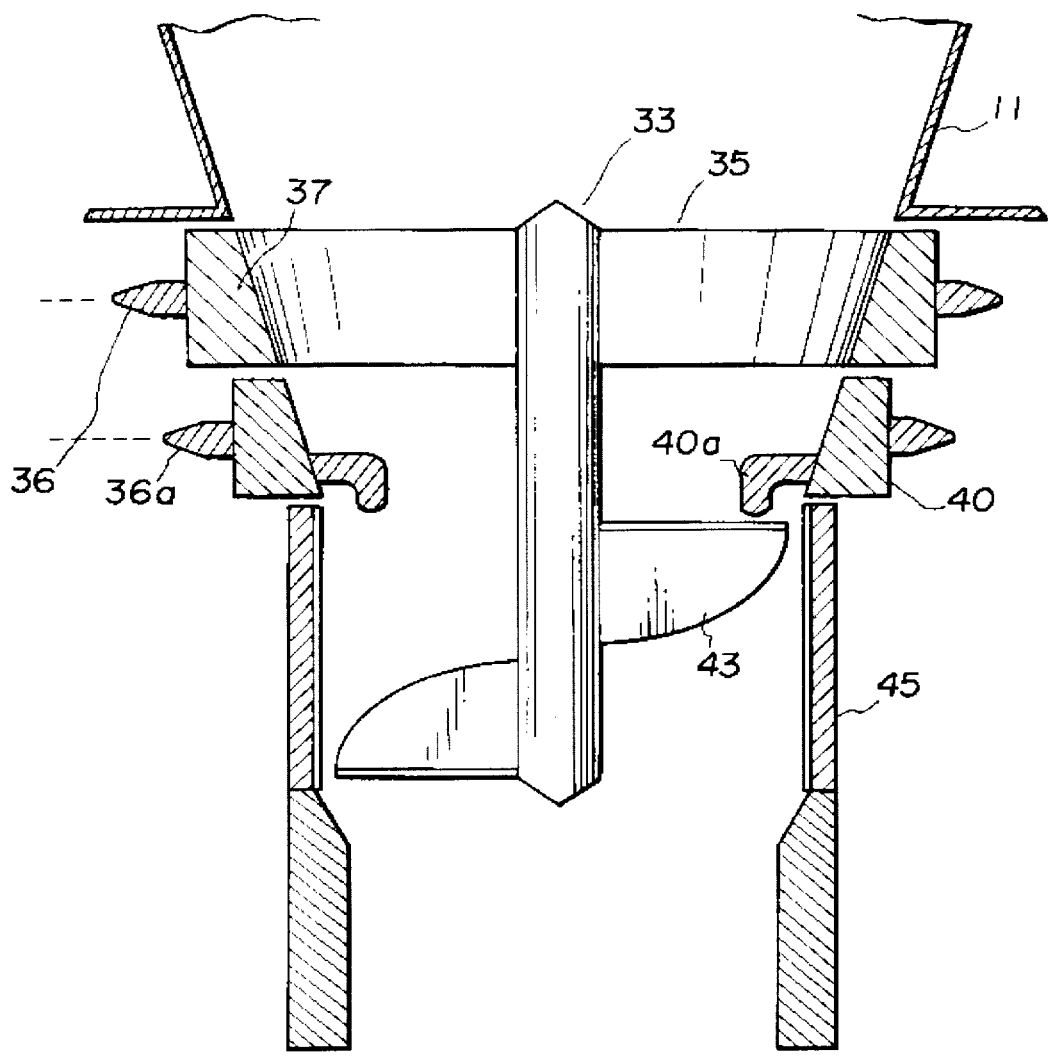
FIG. 25 is a cross-sectional view of a modification of the compression section of the second embodiment.

According to the present embodiment, as seen in FIG. 22, the a plurality of scraper hooks 40a are provided inwardly projecting from an annular ring 42. The annular ring 42 may be mounted via a bearing or the like for engaging a second drive gear 302 connected with the driving source (not shown) for rotating the annular ring 42 along with the scraper hooks 40a, that is the annular ring 42 may be driven via gear teeth (not shown) provided on an outer side thereof for engaging with the drive gear 302, or alternatively, the outer side thereof may be formed as a sprocket with teeth 36a, as seen in FIG. 25, for being driven by a chain (not shown) or the like such that the annular ring 42 is rotatingly driven such that the scraper hooks 40a are rotated for continuously clearing the top of the screw blade 43 during paper processing. Preferably, according to the present embodiment, the annular ring 42 is driven in the same direction as the screw blade 43 at a higher speed than the screw blade 43. According to this, optimal performance and smoothness of feeding can be obtained for the compression section 30 of the waste paper processing system 1 according to the invention. It will be noted that the first and second drive gears 301, 302 may be driven by separate driving sources respectively or they be driven by a common motor (not shown) via appropriate gearing, or the like. According to the preferred embodiment, the first and second drive gears may be driven by a motor (not shown) which commonly drives one or both of the shafts 4 and 5 which mount the shredding blades 6 . . . and 7 . . .

Alternatively however, a stationary scraper 40 may be provided or the annular ring mounting the scraper hooks 40a may be driven to rotate in a direction opposite to that of the screw blade 43.

It will further be noted that, although according to the present embodiment, a sub-hopper 39 is provided for stopping turbulent motion of the shredded paper 25a after passing the rotor 81, the compression section 80 may be arranged such that the rotating scraper 40 is provided after the circular hub 87. That is, the sub-hopper may be omitted as shown in FIG. 25.

Figure 26:
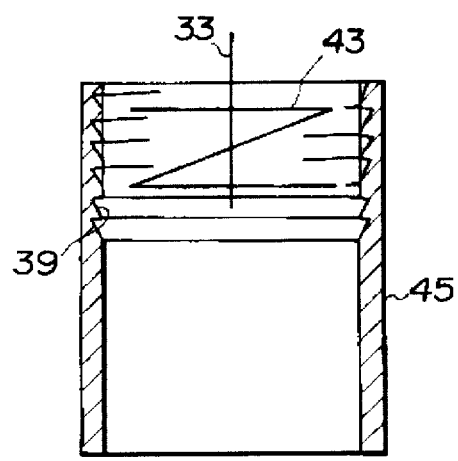
FIG. 26 is a cross-sectional view of a compression tube portion of the compression section.
Figure 27A:
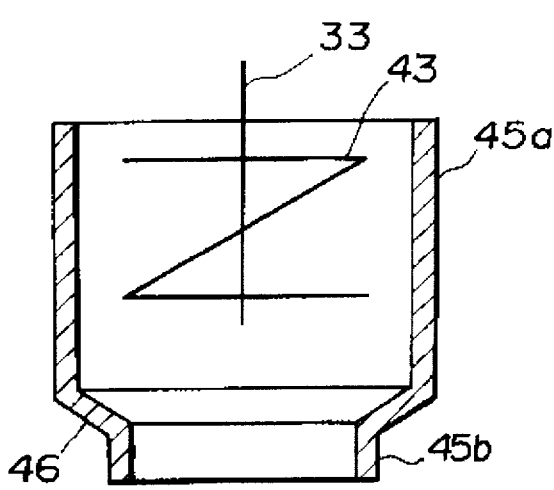
FIGS. 27(A)–27(D) show modification of a compression tube portion of the compression section according to the second embodiment.
Figure 27C:
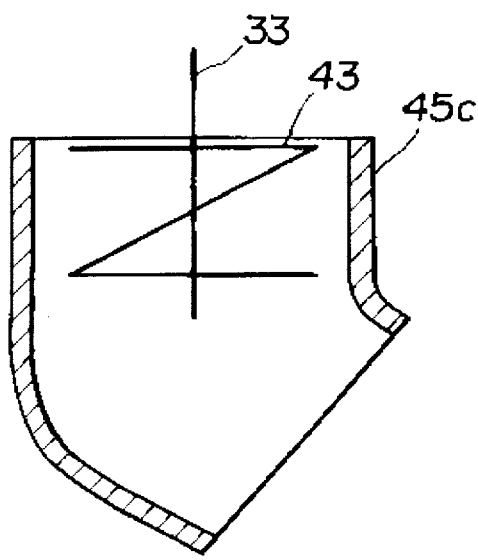
Figure 27B:
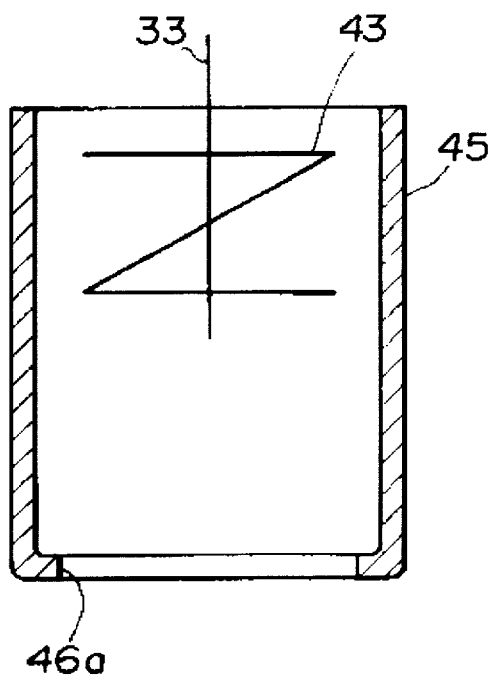
Figure 27D:
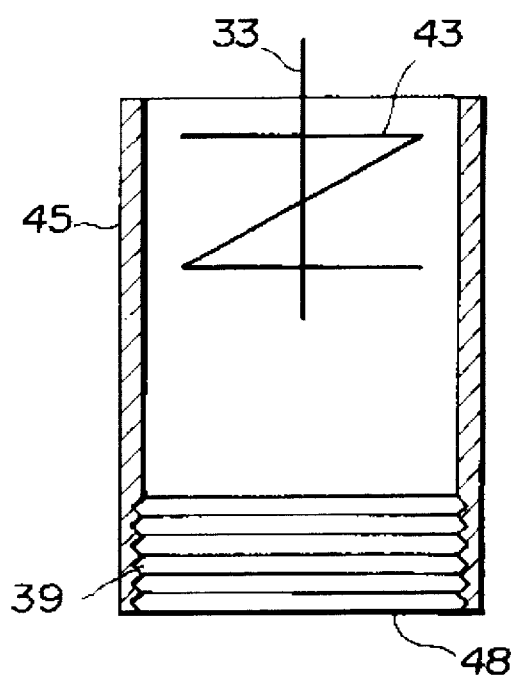
Figure 28A:
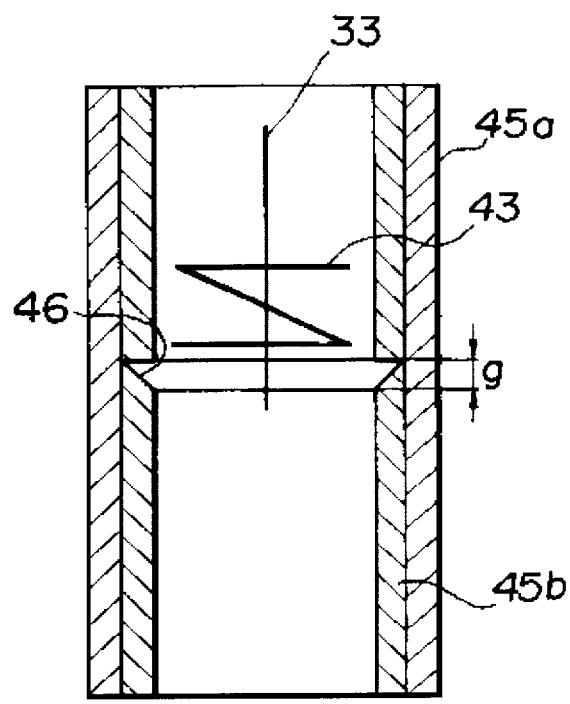
FIGS. 28(a) and 28(b) is an explanatory cross-sectional view of an upper and lower compression tube portion of the compression section for explaining a gap provided between the upper and lower tubes.
Figure 28B:
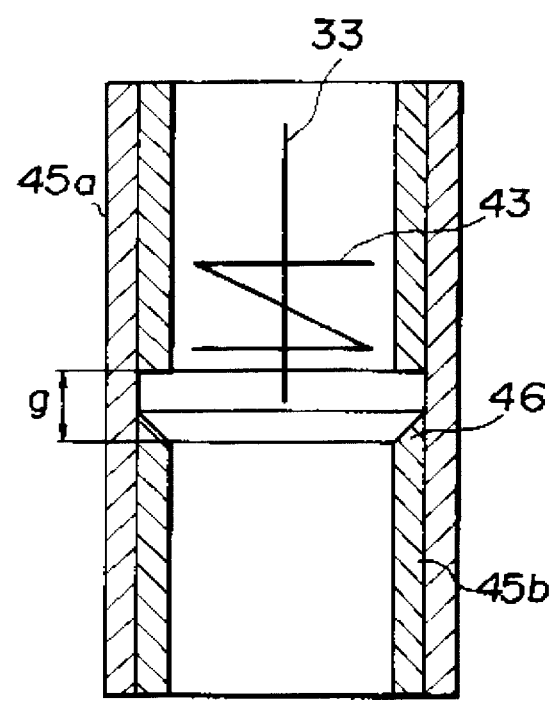
Figure 29:
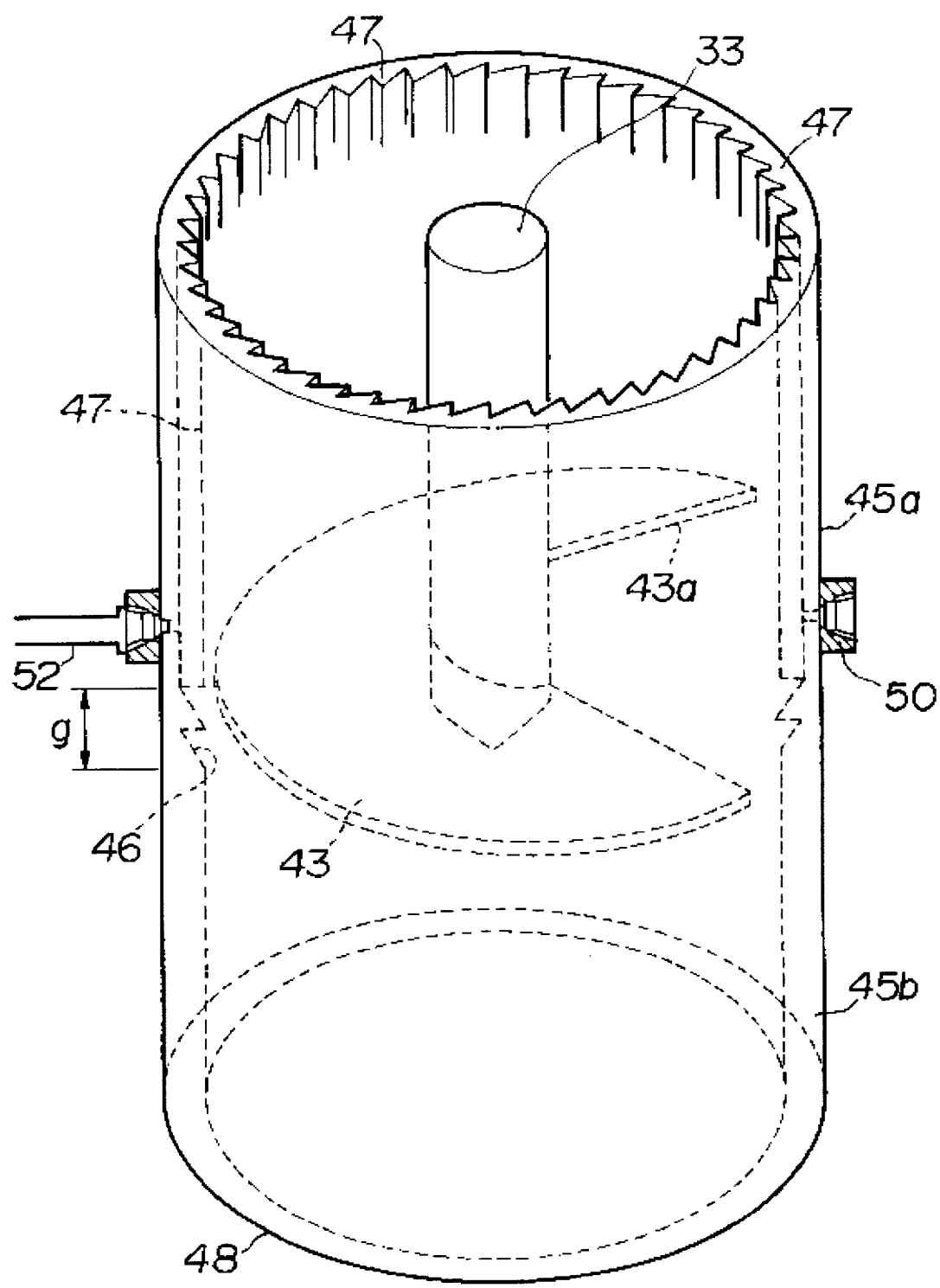
FIG. 29 is a perspective view of a preferred construction of the compression section.

Referring now to FIGS. 26 and 29, it may be seen that the compression tube portion 45 is divided into an upper tube 45a and a lower tube 45b. As seen in the drawing, the inner circumference of the upper tube 45a has a serrated, or toothed surface comprising a plurality of vertically extending projections 47. These projections 47 provide a high friction surface for catching the pieces of shredded paper 25a for allowing a high density of shredded paper to be introduced to the upper tube 45a and for providing additional shredding effect as the pieces of shredded paper 25a are compressed and reduced to pulped paper 26 while pushed into the upper tube 45a according to rotation of the screw blade 43. As seen in FIGS. 26 to 28, a variety of configurations of the compression tube 45 may be utilized.

Referring to FIGS. 26–28 it will be noted that, although the inner circumference of the upper tube 45a is provided with the vertically extending projections 47 according to the present embodiment, the upper tube 45a may alternatively be formed with annular projections 49 as shown in FIG. 26. The annular projections 49 may be provided over the entire inner surface of the upper tube 45a, or alternatively may be provided in a single band at one location along the inside of the upper tube 45a, or at a plurality of locations along the inside of the upper tube 45a. According to this, the same advantages are available as with the vertical projections 47 of the second embodiment.

FIG. 27 shows several configurations of the compression tube 45. FIG. 27(A) shows the screw blade 43 disposed well up in the upper tube 45a and having a narrower lower tube 45b with a tapered portion 46 therebetween. FIG. 27(B) shows a cylindrical compression tube 45c having a narrow outlet opening 46a at a bottom side thereof. FIG. 27(C) shows a curved compression tube 45 for directing an output pulped paper 26 in a predetermined direction, the curved compression tube 45c also provides additional compression force. FIG. 27(D) shows a compression tube 45 having annular rings 39 provided proximate an outlet end 48 thereof. Various other configurations of the compression tube 45 are also possible within the scope of the invention.

Figure 21:
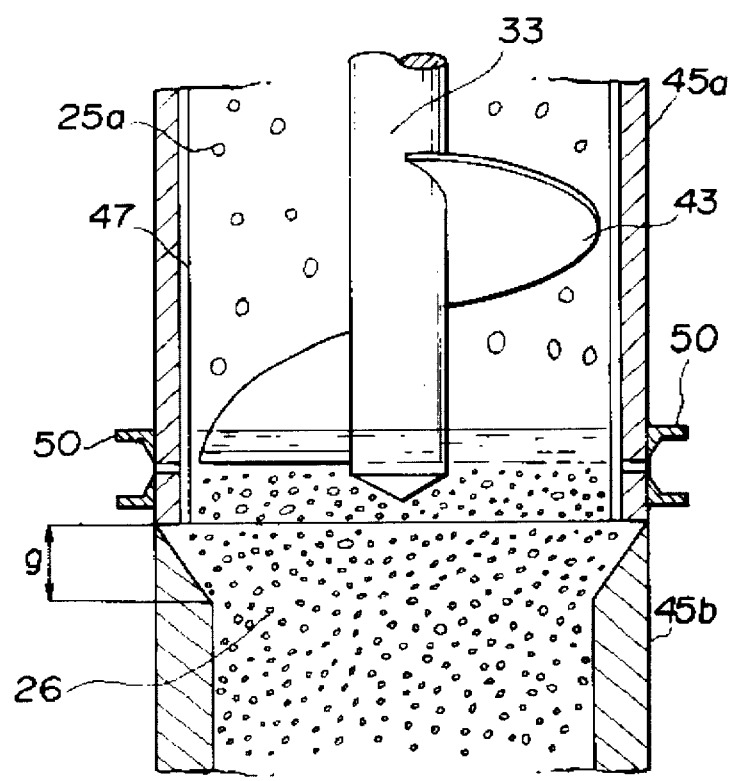
FIG. 21 is a side view of the compression section of FIG. 20 during compression operation.

As seen in FIGS. 20, 21 and 29, the upper tube 45a includes a plurality of fluid inlets 50 spaced circumferentially therearound. The fluid inlets 50 are connected to fluid lines 52 which are connected to a fluid tank 54 (not shown) via a valve (not shown). During compressing operation of the screw blade 43, a fluid, such as water for example, may be introduced into the upper tube 45a for mixing with the shredded paper being processed therein. Thus, as mentioned above, the shredded and compressed paper is moistened into pulped paper 26 before being introduced into the lower tube 45b of the compression tube portion 45. The above-mentioned valve may be associated with optical sensors 90, 92 (see FIG. 31) or the like and a timer (not shown) for detecting the presence of the shredded paper 25a and opening the valve for a predetermined time so as to provide a required amount of fluid for binding the pulped paper as will be further explained hereinlater.

Referring now to FIG. 21, it may be seen that the lower tube 45b of the compression tube portion 45 has a diameter smaller than that of the upper tube 45a according to the present embodiment. The diameter of the lower tube 45b is approximately 5% smaller than a diameter of the upper tube 45a although an identical diameter or other dimensions may also be preferably employed. Further, referring to FIGS. 28(A) and 28(B), it will be noted that a gap g is provided between the upper and lower tubes 45a and 45b. The gap g may be formed as a circular groove between the upper and lower tubes 45a and 45b having a diameter equal to or wider than the upper tube 45a. A width, or vertical dimension of the gap g is selected between 2 and 5 mm. Provision of the gap g is effective to prevent clogging and/or jamming during compression processing operation. Further, the gap g may be adjusted according to a hardness or softness desired for the output of the compression section 30, a longer distance of the gap g results in a harder compression of pulped paper 26 from the compression section 30 and a shorter distance results in a softer compression of pulped paper 26 from the compression section 30.

Immediately below the gap g, an inwardly tapered portion 46 is provided. The tapered portion 46 is provided for easily guiding pulped paper 26 output from the upper tube 45a into the lower tube 45b. According to the present embodiment, a taper angle of 70° has been determined for providing optimal feed characteristics into the lower tube 45b, although other taper angles may also be utilized. In the lower tube 45b the inner surface is left smooth and the paper 25 which has been shredded and pulped in the upper tube 45a is forced into the lower tube 45b under pressure by continued rotation of the screw blade 43. Thus, as more shredded paper 25a falls from the shredding chamber 2a through the filter 10 and into the hopper 11 to be introduced into the sub-hopper via the hub 37 and spokes 35 of the rotor 31, to become pulped paper 26 after processing in the upper compression tube 45a, the pulped paper 26 is forced further into the lower compression tube 45b such that, after continued processing, the entire length of the lower tube 45b is filled and a compacted pulp mass 26a is forced from an output end 48 of the lower tube 45b. A total length of the upper and lower tubes 45a and 45b is selected to assure sufficient compression takes place and that the output compacted pulp mass 26a is sufficiently compressed as to remain in bulk form. That is, due to the fluid introduced to the pulped paper 26 in the upper tube 45a and the subsequent further compression in the lower tube 45b, the fluid acts as an adhesive such that the pulped paper bonds together into a coherent mass and will remain so even after the fluid has dried or evaporated. It will further be noted that no special fluid or chemical need be employed for this process and that ordinary water is sufficient for achieving the desired result.

It will be noted that the upper and lower tubes 45a and 45b of the compression section 30 may be formed integrally including the vertical projections 47 and the gap g, alternatively the upper and lower tubes 45a and 45b may be formed separately to be joined adjustably at the location of the gap g, such as by threading the upper or lower tube 45a or 45b into a corresponding threaded portion of the other of the tubes 45a or 45b, for adjusting a dimension of the gap g.

Figure 30:
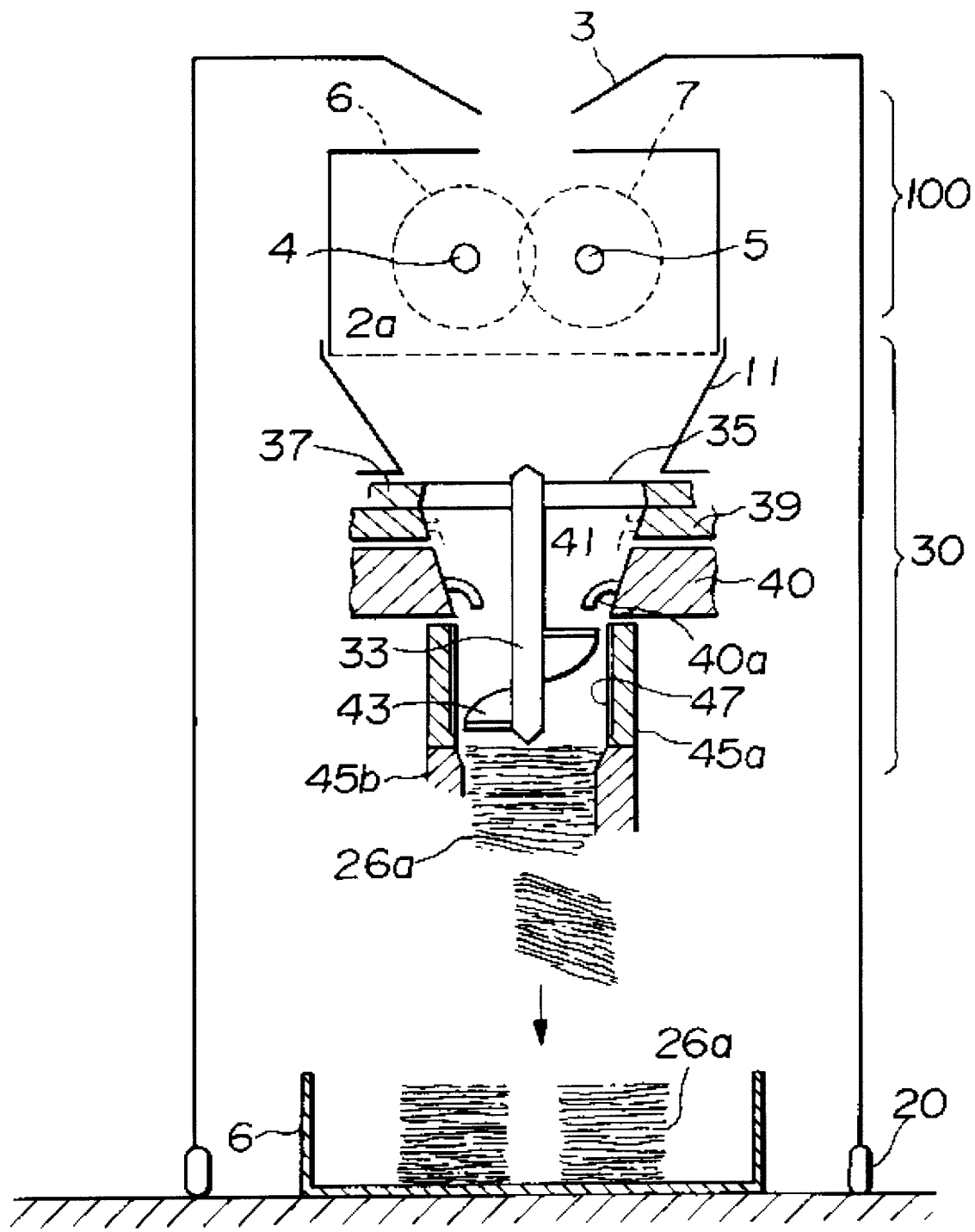
FIG. 30 is a schematic view of the waste paper processing system of the second embodiment.

As processing of waste paper is continued, compacted pulp mass 26a output from the output end 48 of the lower tube 45b will be caused to break into smaller pieces according to a weight of the mass 26a which is projected from the output end 48 of the lower tube 45b. As seen in FIG. 30, a tray 61 may be provided in a lower portion of the processor casing 2 to catch the compacted pulp mass 26a which are output from the output end 48 of the lower tube 45b of the compression section 30. The compacted pulp mass 26a may then be disposed of or supplied for recycling.

Thus, according to the second embodiment, as shown in FIG. 30 a waste paper processing system 1 is provided including a shredding section 100 and a compression section 30, and which can accomplish shredding, pulping and compacting of waste paper 25 and facilitate efficient disposal thereof.

Hereinbelow a third embodiment of the invention will be described with reference to FIG. 31, in which a sensor system is utilized for supplying fluid 55 from the fluid tank 54 to the fluid inlets 50 according to processing operation. Except for provision of the sensor system described below, the construction and operation of the third embodiment is identical to the above-described second embodiment and like reference numbers will be used to refer to like parts while redundant description will be omitted for brevity.

Figure 31:
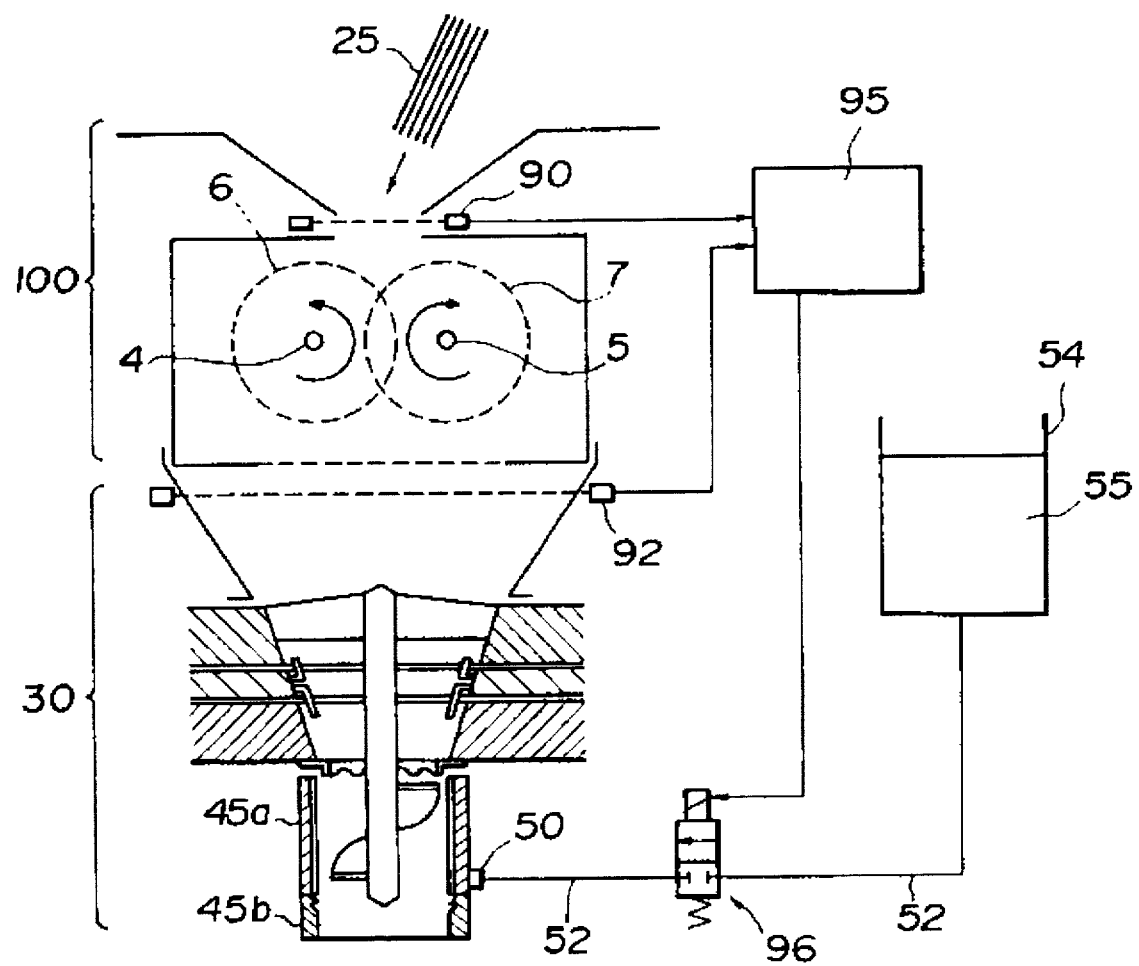
FIG. 31 is a schematic view of a third embodiment of a waste paper processing system according to the invention.

Referring to FIG. 31, it may be seen that the waste paper processing system according to the third embodiment includes a first photo-sensor 90 arranged on the plane of the lower side of the paper inlet opening 3. The first sensor 90 is active to detect completion of insertion of paper 25 into the paper inlet opening and output a signal indicative thereof to a control unit 95. The control unit 95 then outputs a signal for opening an electronic valve 96 interposed between the fluid tank 54 and the fluid inlets 50 such that fluid 55 is allowed to flow from the fluid tank 54 to the fluid inlets 50 via the fluid lines 52 for effecting moistening of the shredded paper 25a for forming pulped paper 26. A second photosensor 92 is provided at a lower side of the hopper 11 for detecting completion of shredding operation by the shredding section 100 and outputs a second signal to the control unit 95 which outputs a signal to the electronic valve 96 for turning off the electronic valve 96 for ceasing the flow of fluid 55 to the fluid outlets 50. According to the present embodiment it will be noted that the fluid outlets 50 are evenly spaced 90° apart around the inner circumference of the compression tube 45 as seen in FIG. 20. Alternatively it is possible to provide a single sensor 90 at the lower side of the inlet opening 3 output a signal indicative of completion of paper insertion to a timer (not shown) for opening the electronic valve 96 for a predetermined period of time after which the electronic valve 96 is closed automatically, thus the automative moisturizing of the shredded paper 26a is simplified. It will further be noted that although a fluid tank 54 is provided above the level of the electronic valve 96 and the fluid inlets 50, the fluid may alternatively be supplied via a pump (not shown) or the like. In other respects, the present embodiment functions in an identical manner to the previously described embodiment.

It will be noted that when large volumes of waste paper 25 are to be processed by the system of the invention, it may be that provision of only the tray 61, as shown in FIG. 30, is insufficient to handle an output volume of the waste paper processing system 1 according to the invention. Thus, a fourth embodiment of the invention is provided which includes a conveyer assembly 60 for handling the output compacted pulp mass 26a of the waste paper processing system 1.

Figure 32:
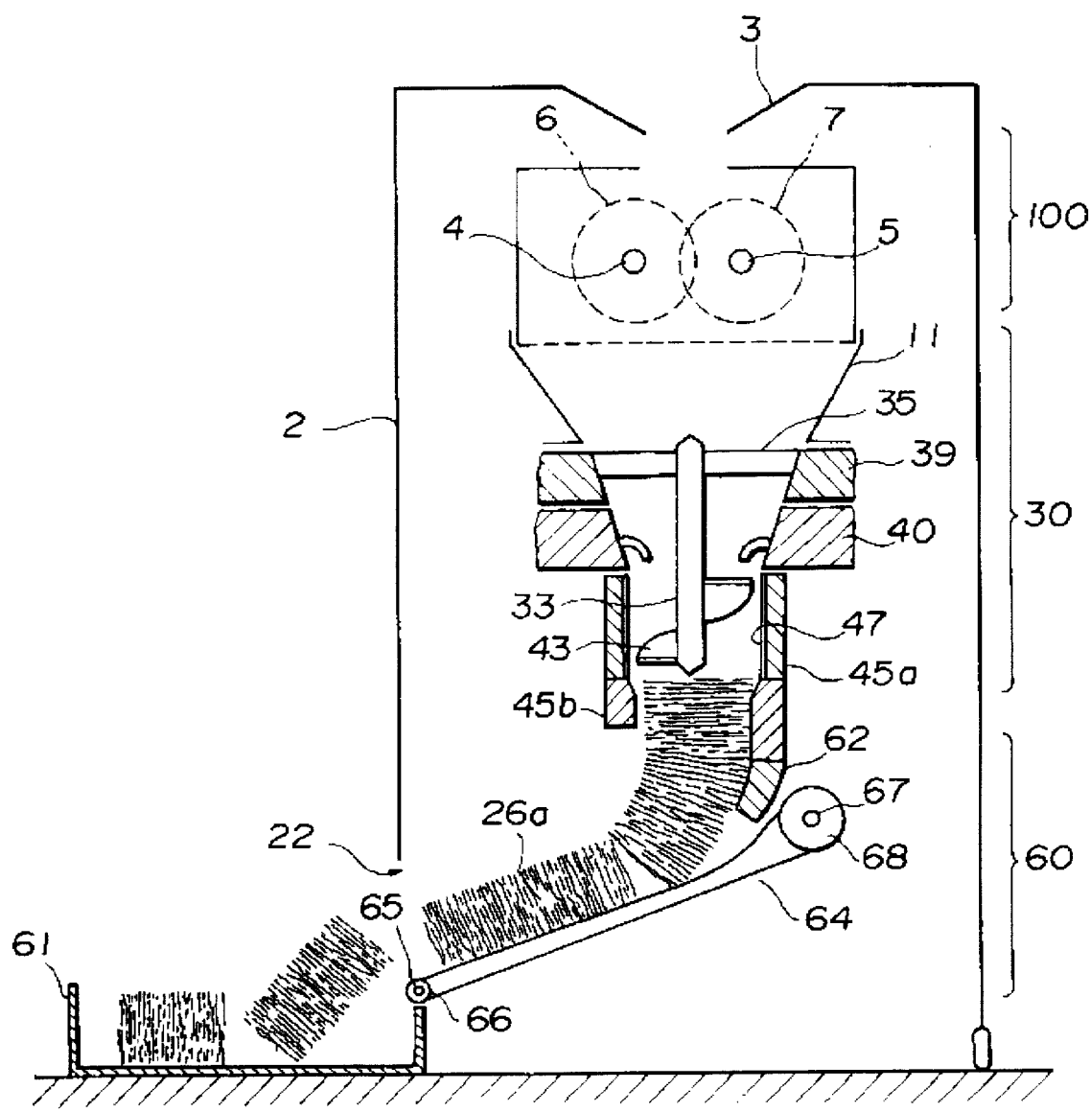
FIG. 32 is a schematic view of a fourth embodiment of a waste paper processing system according to the invention.

Referring now to FIG. 32, the conveyer assembly 60 according to the fourth embodiment invention will be explained in detail. According to the fourth embodiment, a shredding section 100 is provided which is identical to that of the above described first embodiment as well as a compression section 30 as described according to the second embodiment. Like reference numeral will be used to describe like parts and redundant description will be omitted for brevity.

Figure 33:
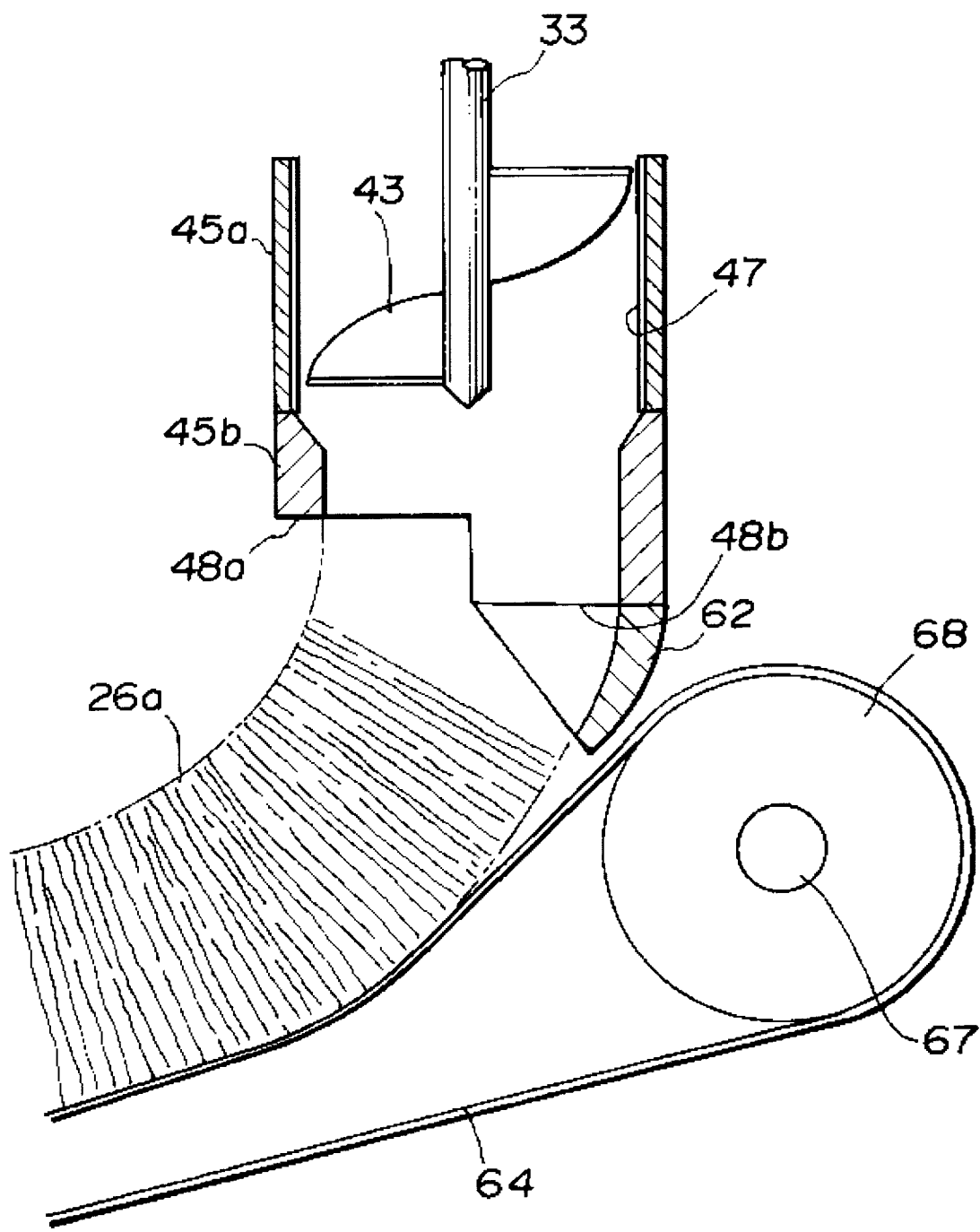
FIG. 33 is an enlarged view of a guide portion of the conveyer assembly of the fourth embodiment.
Figure 34:
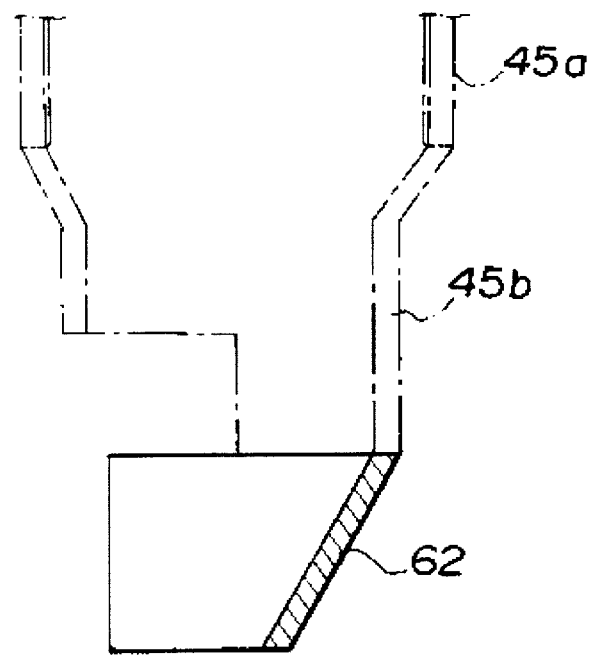
FIG. 34 is a cross-sectional view of an alternative construction of the guide portion of the fourth embodiment.
Figure 35:
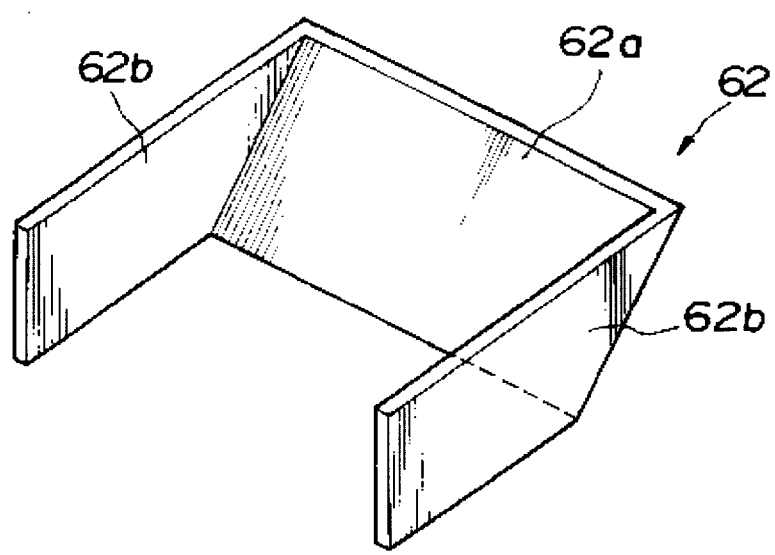
FIG. 35 is a perspective view of the guide portion of FIG. 34.

A conveyer assembly 60 for a waste paper processing system according to the fourth embodiment includes a guide portion 62 attached to the output end 48 of the lower tube 45b of the compression section 30. According to this, as seen in FIGS. 33–35, the output end 48 of the lower tube 45b may be stepped such that a higher (front) side 48a and a lowermost (back) side 48b of the lower tube 45b are formed. The guide portion 62, as seen in FIG. 34 surrounds the lowermost side 48b of the output end 48 and extends downwardly with a wedge shaped configuration comprising an angled back portion 62a and side members 62b, 62b as seen in FIG. 35, or alternatively may be of a curved configuration, so as to urge the compacted pulp 26a in a desired direction upon emerging from the output end 48 of the compression section 30. The guide portion may also alternatively be affixed to a straight bottomed output end 48 such as taught in the second embodiment.

As seen in FIG. 31, as the portions of compacted pulp mass 26a are pushed out of the output end 48 of the lower tube 45b the are directed via the guide portion 62 onto a conveyer belt 64. The conveyer belt 64 is disposed between front and rear rollers 66 and 68, the front roller 66 is mounted on a horizontally disposed first axial shaft 65 disposed proximate a lower side of a front opening 22 provided in a front side of the processor casing 2 and the rear roller 68 is mounted on a second axial shaft 67 mounted rearwardly of the output end 48 of the lower tube 45b of the compression section 30. It will be noted that, according to the present embodiment, a diameter of the rear roller 68 is greater than that of the front roller 66 and that the rear roller 68 is set at a higher elevation than the front roller 66.

Since the conveyer belt 64 is oriented in a downward direction, the conveyer belt 64 is active to move the compacted pulp mass 26a driven solely by the received weight of the compacted pulp mass 26a which is sufficient to turn the rollers for moving the conveyer belt 64 so as to deposit the compacted pulp mass 26a into the tray 61. However, alternatively the conveyer belt 64 may be driven by a motor (not shown) activated automatically via a switch (not shown) upon detecting the weight of the compacted pulp mass 26a upon the conveyer belt 64, or alternatively, the motor driving the conveyer belt 64 may be actuated by a manual switch (not shown) or the like. The tray 61 is then positioned outside and below the front opening 22 of the processor casing and the compacted pulp mass 26a output from the compression section is automatically loaded into the tray. It will be noted that the conveyer assembly according to the present embodiment may be implemented with or without the guide portion 62.

Figure 36:
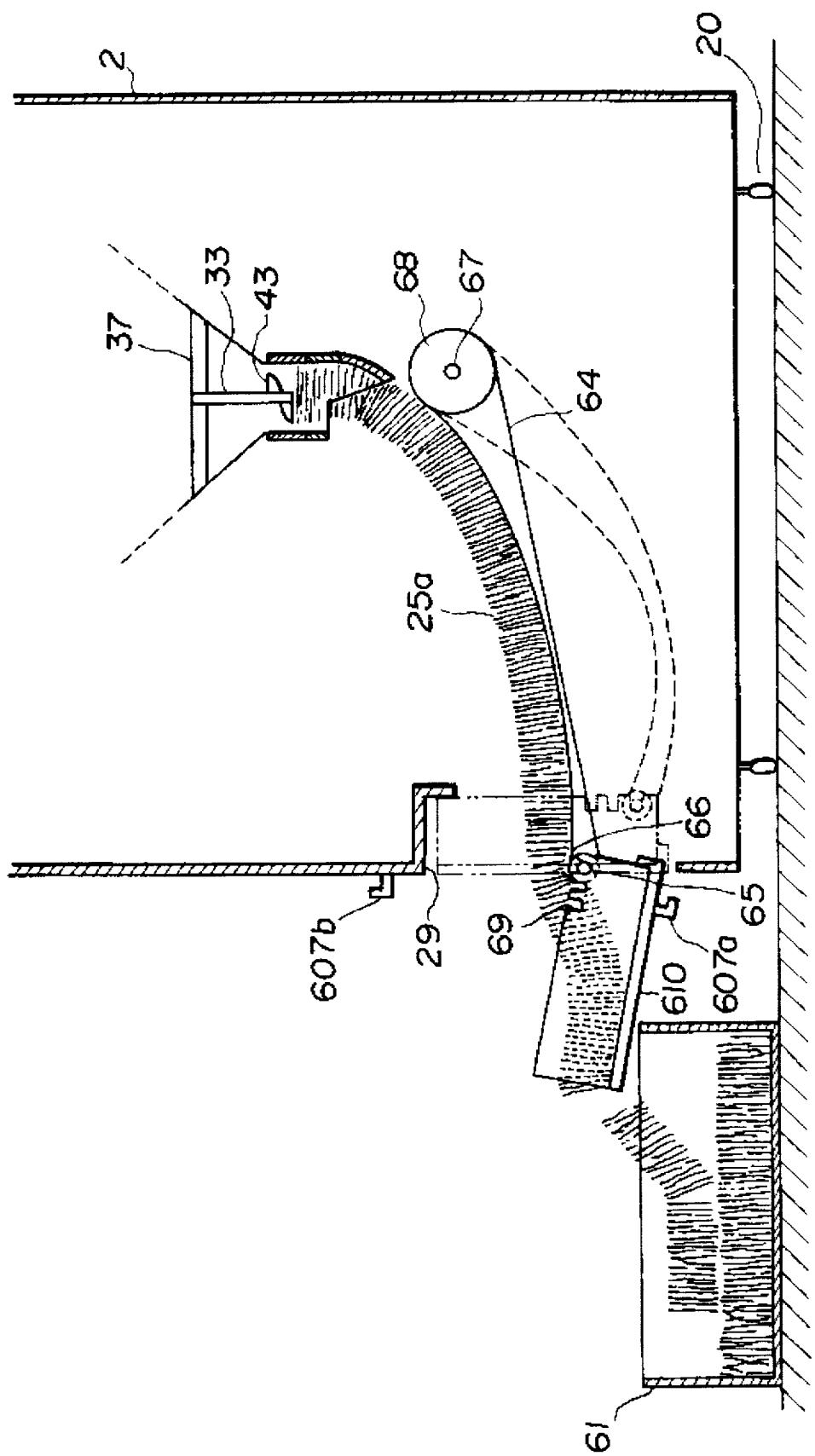
FIG. 36 is a schematic view of a modified arrangement of the conveyer assembly of the fourth embodiment.

Referring now to FIG. 36, an alternative construction of a conveyer assembly according to the fourth embodiment of the invention will be explained in detail.

According to this alternative construction, the conveyer belt 64 is again provided mounted between front and rear rollers 66 and 68. However, according to this construction, the first axial shaft 65 rotatably supporting front roller 66 is received in shaft support grooves 69, 69 provided at either side of a modified tray 610.

Figure 37:
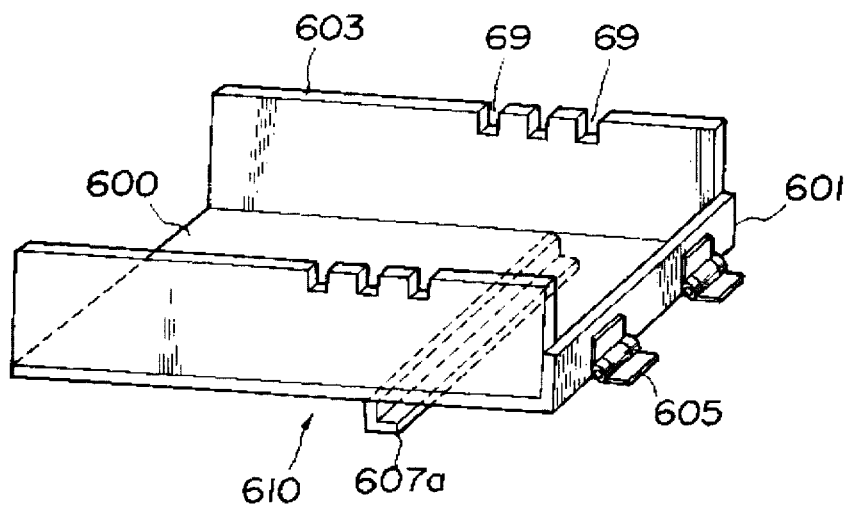
FIG. 37 is a perspective view of a modified tray utilized in the conveyer arrangement of FIG. 36.

As may be seen in FIG. 37, the modified tray 610 comprises a bottom plate 600 having a front side 601 perpendicular to the bottom plate 600. Two side members 603, are set on each longitudinal side of the bottom plate 600, also perpendicular thereto. Each of the side members 603 have a plurality of shaft support grooves 69, 69, . . . formed in an upper side thereof such that each of the shaft support grooves 69 formed in one of the side members 603 has a corresponding, or opposing shaft support groove 69 formed in the other side member 603. A hinge 605, or a pair thereof, is provided at the base of the front side 601 and attached to a lower side of the opening 22 of the processor casing 2, as seen in FIG. 37. On the bottom surface of the bottom plate a first rail 607a is attached in the lateral direction, when the modified tray 610 is positioned vertically it serves to close the opening 22 of the processor casing, for this, a tray support member 29 may be provided for retaining the modified tray in a correct, closed position. Attached to the processor casing 2 laterally, at a position above the opening 22, a second rail 607b is attached. The second rail 607b is arranged so as to be parallel to the first rail 607a when the modified tray 610 is in a closed position.

According to this, when the front first axial shaft 65 supporting the front roller 66 is set between a pair of corresponding shaft support grooves 69 of the side members 603 of the modified tray 610. Thus, as seen in the drawing, when the modified tray 610 is closed, the conveyer belt 64 is slack, and hangs loosely between the first and second rollers 66 and 68.

Figure 38:
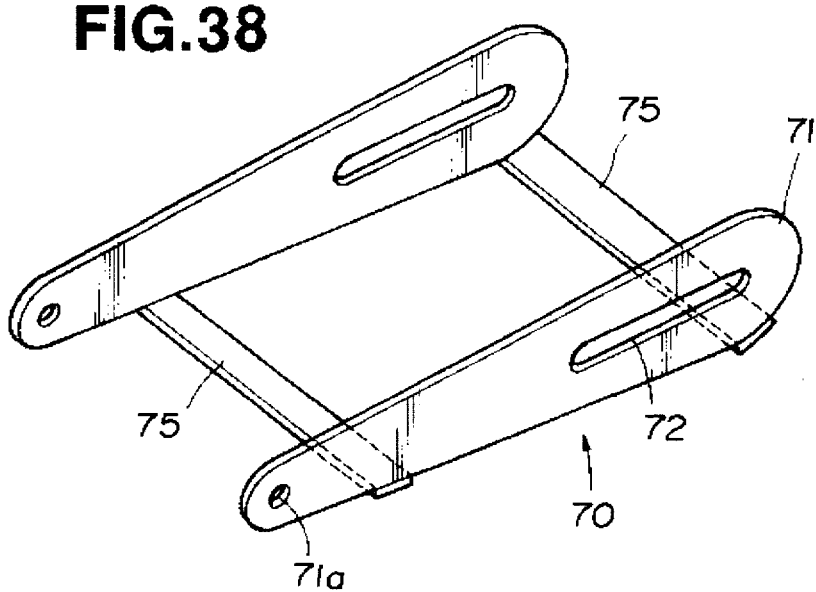
FIG. 38 is a perspective view of a roller guide utilized in the conveyer arrangement of FIG. 36.
Figure 39:
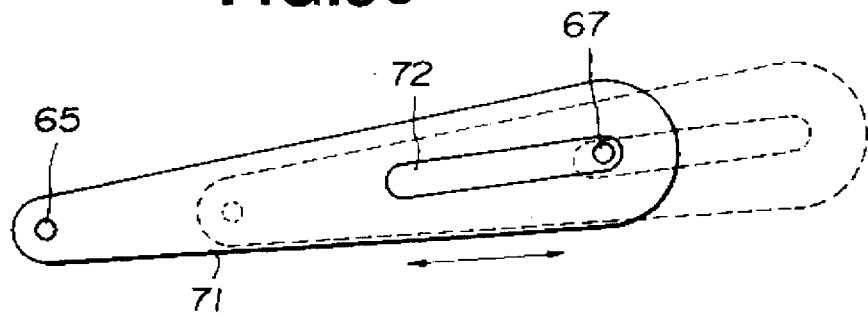
FIG. 39 is a side view of the roller guide of FIG. 38.
Figure 40:
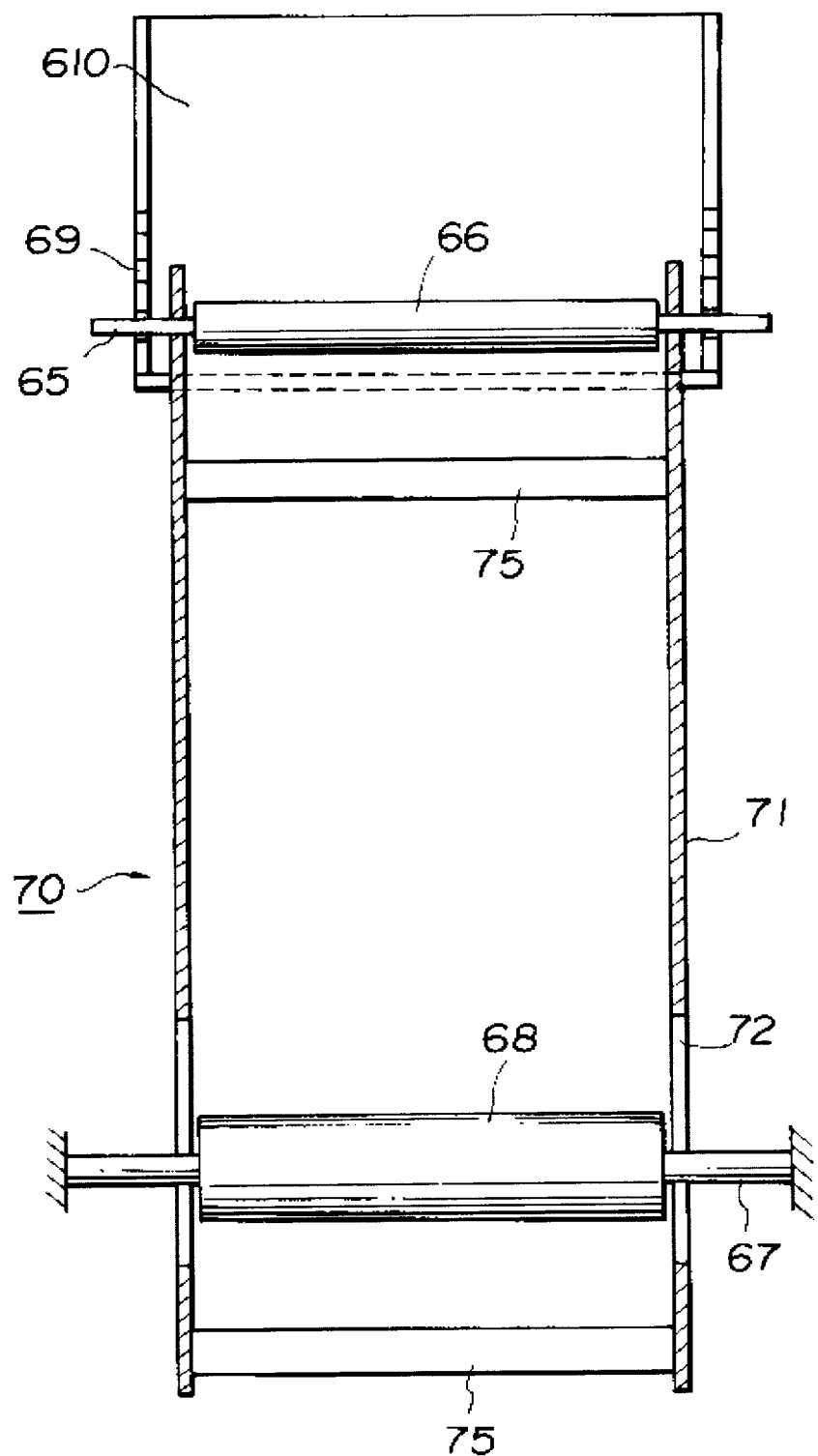
FIG. 40 is a plan view showing the relationship between the roller guide, rollers and the modified tray of the modified conveyer assembly of FIG. 36.

According to this, referring now to FIG. 38 and 39, the front and rear rollers 66 and 68 are supported by a roller guide 70. The roller guide comprises side brackets 71, 71 vertically supported in a spaced apart relation by braces 75, 75. The side brackets 71, 71 have shaft support openings 71a, 71a formed at a front side thereof. Ends of the first axial shaft 65 are fitted into the opposing shaft support openings 71a, 71a of the side brackets 71, 71 such that the front roller 66 is rotatably supported at the front side of the roller guide. Referring to FIG. 40, a short length of the first axial shaft 65 is left exposed at each side of the front roller 66 for being received by the shaft support grooves 69, 69 of the modified tray 610. End portions of the second axial shaft 67 supporting the rear roller 68 are fitted through a pair of elongate grooves 72, 72, one elongate groove 72 being provided in each of the side brackets 71. The ends of the second axial shaft 67 is positionally fixed such that the roller guide 70 is slidable on the second axial shaft 67.

Thus, as seen in FIG. 36, in a initial (vertical) position of the modified tray 610, as indicated by two-dot chain lines in FIG. 36, wherein the belt is held slack and the second axial shaft 67 supporting the rear roller 68 is positioned proximate a front side of the elongate grooves 72, 72. When the modified tray 610 is opened, that is, moved to a substantially horizontal position as indicated in solid lines in FIG. 36, the front roller is moved to the left in FIG. 36, that is, in a direction away from the second roller such that the conveyer belt 64 is tightened and slack is removed therefrom. At this time the roller guide 70 is pulled to the left viewing FIG. 39 according to movement of the first axial shaft 65 and the side brackets slide forward on the second axial shaft 67 via the elongate grooves 72, 72. When the modified tray 610 is horizontally positioned the top side thereof is placed against a tray 61 such that the modified tray conducts the compacted pulp mass 26a from the conveyer belt 64 to the tray 61. During operation of the conveyer belt 64 the side brackets prevent any of the compacted pulp mass from falling over the side of the conveyer belt 64.

Further, if the belt becomes too slack or is of an inappropriate tightness for optimal operation, the first axial shaft 65 may be moved to be retained by a different pair of the shaft support grooves 69, 69 of the modified tray 610. As with the previous embodiment, the conveyer belt 64 may move the compacted pulp mass 26a driven by a received weight of compacted pulp mass 26a sufficient to turn the rollers for moving the conveyer belt 64. However, alternatively the conveyer belt 64 may be driven by a motor (not shown) activated automatically via a switch (not shown) upon detecting the weight of the compacted pulp mass 26a upon the conveyer belt 64, or alternatively, the motor driving the conveyer belt 64 may be actuated by a manual switch or the like.

Figure 41:
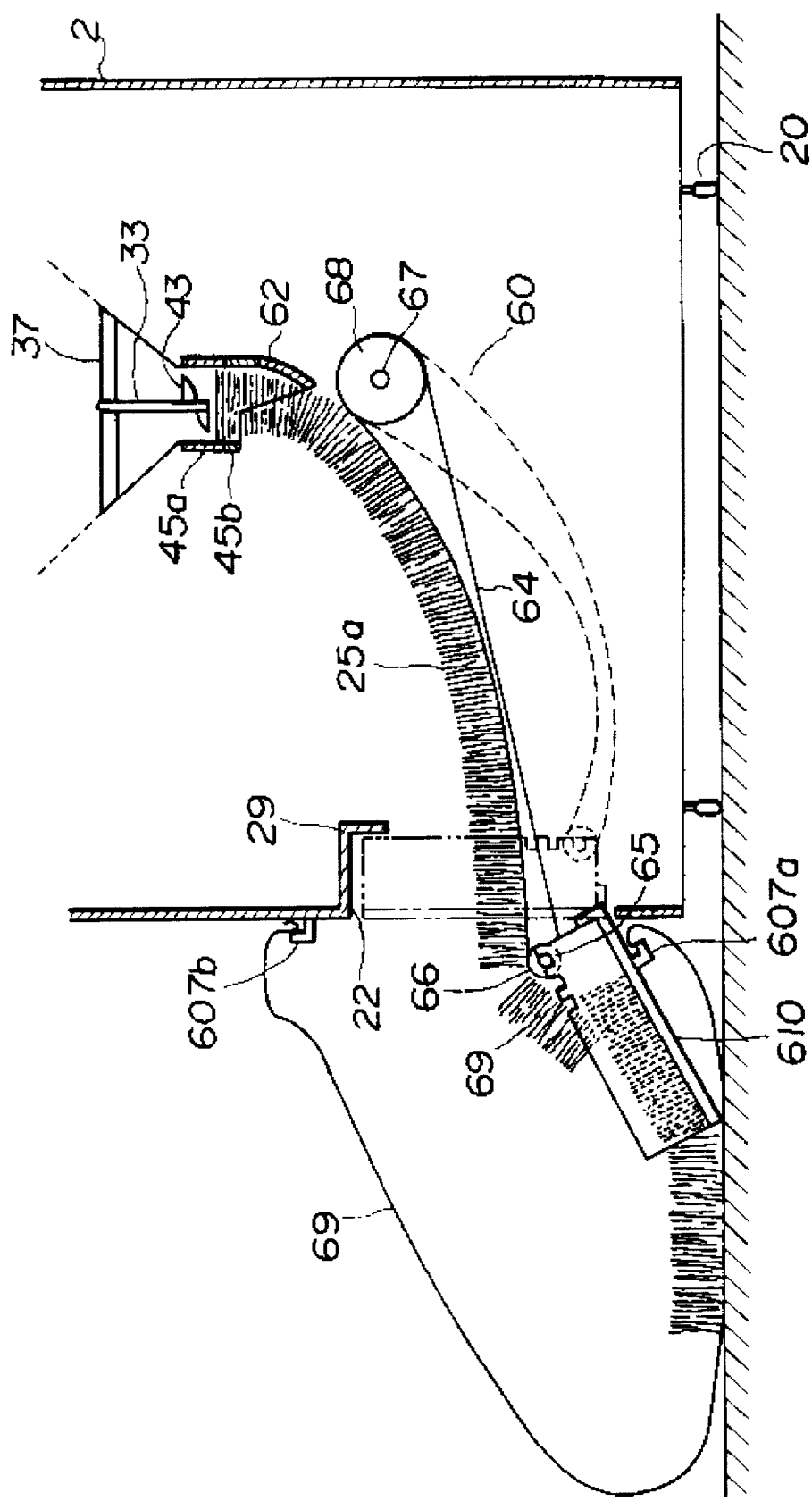
FIG. 41 is a schematic view of a further modification of the conveyer assembly of the fourth embodiment.

The above construction may also be used in the following way, referring to FIG. 41. It will be noted that the first rail 607a is of a downwardly oriented L-shape and that the corresponding second rail 607b mounted on the processor casing 2 is of an upwardly oriented L-shape. The first and second rail may be used for mounting a bag 69 or the like on the outside of the processor casing, thus, when the modified tray is open, it is active to conduct compacted pulp mass 26a from the conveyer belt 64 into the bag 69. According to this, the modified tray is opened widely so as to be angled downward from the hinges, thus the conveyer belt is tightly stretched to remove slack therefrom and user convenience is enhanced since the capacity of the bag 69 may be large and no dust or spillage may occur. In addition all the advantages of the above-described embodiment are available.

It will be noted that the above-described conveyer assembly according to the invention may be also be implemented with or without the guide portion 62.

Figure 42:
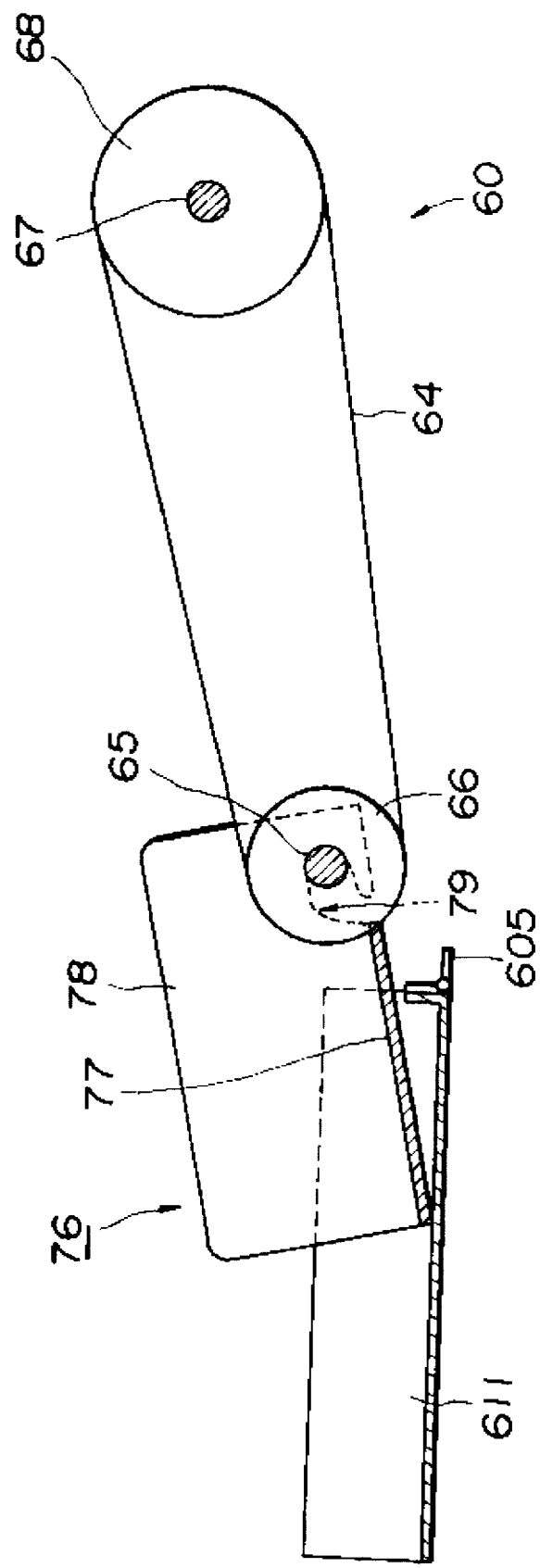
FIG. 42 is a side view showing the relationship between the conveyer belt, rollers, a front hinged tray and a bridge chute of another modification of the conveyer assembly according to the fourth embodiment.

FIG. 42 shows another modification of a modified tray which may be implemented according to the system of the invention. According to this construction, a position of the front roller may be fixed, rather than attached to the modified tray. A bridge chute 76 is connected between the first axial shaft 65 and a front hinged tray 611. The bridge chute 76 comprises a bottom plate 77, two side portions 78, 78 each having a hooked cut-out 79, formed therein respectively. The hooked cut-outs are placed so as to receive end portion of the first axial shaft 65 such that the lower side of the bottom plate 77 extends into the front hinged tray 611. According to this construction, paper fragments, or dust or the like cannot fall between the end of the conveyer belt 64 and the tray 611. It will be noted that, although a front hinged tray 611 is utilized according to the present modification, the bridge chute 76 may be utilized with the tray 61 of the fourth embodiment. The front hinged tray 611 may be constructed to mount a bag 69 or the like similarly to the above-described modified tray 610.

Thus, according to the present invention, a complete waste paper processing system is provided which can receive sheets of waste paper 25 through a paper inlet opening 3 thereof, thoroughly shred the paper 25 into sufficiently small pieces of shredded paper 25a which may then pass through the filter to be received by the compression section 30 via the hopper 11. The shredded paper 25a is then converted to pulped paper 26 and moistened and compressed in the compression section 30 to emerge as a compacted pulp mass 26a. The compacted pulp mass 26a may then be received by the conveyer assembly 60 so as to conduct the compacted pulp mass 26a to a tray 61 or bag 69 without spillage and thus the compacted pulp mass may be easily disposed of or recycled by a user.

It will be noted that the above-described conveyer assembly according to the invention may be also be implemented with or without the guide portion 62.

Further, a bulk of waste paper is significantly reduced by the process of the invention such that a single bag 69 may hold a very large amount of compacted pulp mass 26a rather than the relatively bulky loose strips of paper as in the prior art.

It will also be noted that, although the system of the invention provides a fluid tank 54, a valve 56, fluid lines 52 and fluid inlets 50 in the compression section 30, the system of the invention may operate without addition of fluid during compression processing. According to this, the shredded paper 25a is reduced to small flakes which are substantially less bulky than shredded strips as in the prior art, also the conveyer is active to supply the paper flakes to a tray 61 or bag 69 without spillage as taught hereinabove. According to this, it is preferable that the conveyer belt 64 be powered by a motor or the like.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A waste paper compression for reducing bulk and facilitating recyclability of waste paper, comprising:

an input hopper for receiving waste paper in a shredded or particulate condition;

a rotor comprising a first driven annular ring rotatably driven by a driving source and positioned to correspond to an outlet side of said input hopper;

a main shaft, joined to said first annular ring by a plurality of spokes, said main shaft being substantially axially aligned with said input hopper, extending therefrom in said feeding direction and rotatably driven according to rotation of said first annular ring;

a screw blade spirally projected from a lower side of said main shaft at a predetermined circumference, said screw blade terminating at a lower end of said main shaft;

an anti-clogging portion comprising an annular member disposed under said first driven annular ring, and receivable of waste paper from said input hopper via said rotor, said anti-clogging portion having a plurality of scraping members projected radially inward from an annular inner surface thereof, lower edges of said scraping members being disposed at a position slightly above that of a leading edge of said screw blade so as to pass closely proximate to said leading edge according to rotation of said screw blade, said anti-clogging portion receiving therethrough a section of said main shaft just above that from which said screw blade is projected;

a compression tube disposed under said anti-clogging portion and coaxially aligned with said main shaft in said feeding direction, said compression tube receiving a predetermined length of said lower side of main shaft mounting said screw blade, said compression tube comprising;

a first inner circumferential surface formed at an upper side of said compression tube which closely accommodates said circumference of said screw blade;

a second inner circumferential surface formed at a lower side of said compression tube below a position corresponding to a lower terminus of said main shaft, said second inner circumferential surface having a diameter smaller than said upper side thereof by a predetermined degree;

a high friction surface provided on at least said first inner circumferential surface of said compression tube; and an output opening at an output side of said compression tube.

2. A waste paper compression apparatus as set forth in claim 1, wherein said annular member of said anti-clogging portion is formed as a sub-hopper positioned below said first driven annular ring and receiving therethrough an upper portion of said main shaft above that supporting said screw blade.

3. A waste paper compression apparatus as set forth in claim 2, wherein said sub-hopper is formed with an inner surface tapered in said feeding direction, said tapered inner surface further having a plurality of stopper hooks projected radially inward therefrom at a position above said scraping members.

4. A waste paper compression apparatus as set forth in claim 1, wherein said annular member of said anti-clogging portion is formed as a second driven annular ring rotatably driven by said driving source and positioned at a lower side of said first driven annular ring.

5. A waste paper compression apparatus as set forth in claim 4, wherein said second driven annular ring is driven via gear teeth provided on an outer side thereof for engaging with a second drive gear operatively associated with said driving source.

6. A waste paper compression apparatus as set forth in claim 4, wherein the outer side of said second driven annular ring is formed as a sprocket with teeth and being driven by a chain operatively associated with said driving source.

7. A waste paper compression apparatus as set forth in claim 4, wherein the second driven annular ring is driven in the same direction as the screw blade at a higher speed than said screw blade.

8. A waste paper compression apparatus as set forth in claim 4, wherein said second driven annular ring is rotated at a speed 10% to 20% higher than said screw blade.

9. A waste paper compression apparatus as set forth in claim 4, wherein said second driven annular ring is rotated at a speed 20% to 30% higher than said screw blade.

10. A waste paper compression apparatus as set forth in claim 4, wherein said driving source commonly drives a paper shredding means operatively associated with said compression apparatus, said first driven annular ring and said second driven annular ring.

11. A waste paper compression apparatus as set forth in claim 1, wherein said annular member of said anti-clogging portion is formed as a sub-hopper, said anti-clogging portion further including a second driven annular ring receiving therethrough a portion of said main shaft below that received by said sub-hopper and above that supporting said screw blade, said plurality of scraping members being provided on said second driven annular ring so as to project radially inward from an annular inner surface thereof, said lower edges of said scraping members passing closely proximate said leading edge of said screw blade according to mutual rotation of said first and second driven annular rings.

12. A waste paper compression apparatus as set forth in claim 11, wherein said annular inner surface of said second driven annular ring is tapered in said feeding direction.

13. A waste paper compression apparatus as set forth in claim 1, wherein a gap of predetermined dimension is present between said upper and lower sides of said compression tube.

14. A waste paper compression apparatus as set forth in claim 13, wherein a vertical dimension of said gap is selected between 2 mm and 5 mm.

15. A waste paper compression apparatus as set forth in claim 13, wherein a vertical dimension of said gap is adjustable.

16. A waste paper compression apparatus as set forth in claim 13, further including a tapered portion tapered at a predetermined angle and formed between said gap and said lower side of said compression tube.

17. A waste paper compression apparatus as set forth in claim 16, wherein a taper angle of said tapered portion of said lower side of said compression tube is 70° so as to provide optimal feed characteristics into said lower side of said compression tube.

18. A waste paper compression apparatus as set forth in claim 13, wherein said upper and lower side of said compression tube are formed separately and joined adjustably at the location of said gap.

19. A waste paper compression apparatus as set forth in claim 13, wherein said upper or lower sides of said compression tube have a threaded portion engageable with a corresponding threaded portion of the other of said sides for adjusting a dimension of said gap.

20. A waste paper compression apparatus as set forth in claim 13, wherein said gap is formed as a circular groove between the upper and lower tubes having a diameter equal to or wider than said first circumferential surface.

21. A waste paper compression apparatus as set forth in claim 1, wherein said annular inner surface of said anti-clogging portion is tapered in said feeding direction.

22. A waste paper compression apparatus as set forth in claim 1, wherein said input hopper is formed so as to be substantially funnel-shaped.

23. A waste paper compression apparatus as set forth in claim 1, further including moisturizing means active to introduce a fluid into said compression tube during waste paper compressing operation, said moisturizing means including a plurality of fluid inlets spaced circumferentially around said upper side of said compression tube and a fluid source connected to said fluid inlets.

24. A waste paper compression apparatus as set forth in claim 23, wherein a total length of said compression tube is selected to assure sufficient compression of waste paper introduced therethrough via said rotor such that an output of a moisturized compressed pulp mass therefrom is sufficiently compressed as to remain in bulk form.

25. A waste paper compression apparatus as set forth in claim 23, wherein said moisturizing means further includes a sensor provided at a lower side of an inlet opening of said paper shredding means and outputting a signal indicative of completion of paper insertion to a timer for opening an electronic valve interposed between said fluid source and said fluid inlets for a predetermined period of time after which said electronic valve closes automatically.

26. A waste paper compression apparatus as set forth in claim 23, wherein said fluid is water.

27. A waster paper compression apparatus as set forth in claim 26, wherein said sensor is a photo-sensor.

28. A waste paper compression apparatus as set forth in claim 1, wherein said first driven annular ring is supported by three spokes projected from said upper side of said main shaft.

29. A waste paper compression apparatus as set forth in claim 1, wherein said first driven annular ring is mounted via a bearing to engage a first drive gear connected with a driving source for rotating a hub along with the spokes and the main shaft.

30. A waste paper compression apparatus as set forth in claim 3, wherein said stopper hooks include upwardly oriented stopper hooks provided at an upper side of said sub-hopper and downwardly oriented stopper hooks provided at a lower side of said sub-hopper.

31. A waste paper compression apparatus as set forth in claim 30, wherein the second driven annular ring mounting the scraper hooks is driven to rotate in a direction opposite that of the screw blade.

32. A waste paper compression apparatus as set forth in claim 1, wherein said first driven annular ring is driven via teeth provided on an outer side thereof for engaging with a first drive gear operatively associated with said driving source.

33. A waste paper compression apparatus as set forth in claim 1, wherein the outer side of said first driven annular ring is formed as a sprocket having teeth for being driven by a chain operatively associated with said driven source.

34. A waste paper compression apparatus as set forth in claim 1, wherein an annular inner surface of said first driven annular ring is tapered in a direction opposite said feeding direction.

35. A waste paper compression apparatus as set forth in claim 1, wherein a total circumferential span $\Theta$ of said screw blade is formed within 360°, such that no part of the screw blade overlaps itself in the vertical dimension.

36. A waste paper compression apparatus as set forth in claim 1, wherein the screw blade occupies a total circumferential span e of 300°.

37. A waste paper compression apparatus as set forth in claim 36, wherein a total circumferential span $\Theta$ of said screw blade is between 180° and 360°.

38. A waste paper compression apparatus as set forth in claim 1, wherein said screw blade includes a leading edge which is beveled at an angle $\alpha$ of 90° or less.

39. A waste paper compression apparatus as set forth in claim 1, wherein said leading edge and a lower, trailing edge of said screw blade project radially from the main shaft at mutually different angles.

40. A waste paper compression apparatus as set forth in claim 1, wherein a radial length of said leading edge is greater than a radial length of a trailing edge of said screw blade by a predetermined degree.

41. A waste paper compression apparatus as set forth in claim 1, wherein a base portion of a trailing edge of said screw blade includes a blunt edge projected below said trailing edge and a tapered and curved triangular base projected from the lower surface of said screw blade proximate said trailing edge.

42. A waste paper compression apparatus as set forth in claim 1, wherein said screw blade is driven, via rotation of said main shaft via said first driven annular ring by said driving means, at between 100 and 150 rpm.

43. A waste paper compression apparatus as set forth in claim 1, wherein said driving source is an electric motor.

44. A waste paper compression apparatus as set forth in claim 1, wherein said driving source is a plurality of electric motors.

45. A waste paper compression apparatus as set forth in claim 1, wherein said high friction surface of said compression tube is formed as a serrated, or toothed surface comprising a plurality of vertically extending projections.

46. A waste paper compression apparatus as set forth in claim 1, wherein said high friction surface is formed as annular projections provided over the entire inner surface of the upper side of said compression tube.

47. A waste paper compression apparatus as set forth in claim 1, wherein said high friction surface is formed as annular projections provided in an upper annular portion of said upper side of said compression tube.

48. A waste paper compression apparatus as set forth in claim 1, wherein said high friction surface is formed as annular projections provided at a plurality of locations along the inside of said upper side of said compression tube.

49. A waste paper compression apparatus as set forth in claim 1, wherein said compression tube is of a single cylindrical configuration having a narrower outlet opening at a bottom side thereof than an inlet opening at an upper side thereof.

50. A waste paper compression apparatus as set forth in claim 1, wherein a lower side of said compression tube is curved and capable of directing waste paper outlet therefrom in a predetermined direction.

51. A waste paper compression apparatus as set forth in claim 1, wherein said compression tube has annular rings provided on its inner surface proximate an outlet end thereof.

52. A waste paper compression apparatus as set forth in claim 1, wherein a diameter of said lower side of said compression tube is approximately 5% smaller than a diameter of said upper side thereof.

53. A waste paper compression apparatus as set forth in claim 1, further including a tray provided in a lower portion of an apparatus casing positioned so as to catch a compressed pulp mass output from said output opening of said compression tube.

\* \* \* \* \*